United States Patent
Ono et al.

(10) Patent No.: US 6,314,137 B1
(45) Date of Patent: Nov. 6, 2001

(54) VIDEO DATA COMPRESSION SYSTEM, VIDEO RECORDING/PLAYBACK SYSTEM, AND VIDEO DATA COMPRESSION ENCODING METHOD

(75) Inventors: Koichi Ono, Yokosuka; Hideo Nishijima; Takayuki Kanesaki, both of Hitachinaka; Tadasu Horiuchi; Nobuyoshi Tsukiji, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/050,568

(22) Filed: Mar. 30, 1998

(30) Foreign Application Priority Data

Mar. 31, 1997 (JP) .................................................. 9-080082

(51) Int. Cl.[7] .................................................. H04N 7/12
(52) U.S. Cl. .................................... 375/240; 375/240.01
(58) Field of Search .................................. 348/402, 409, 348/14.1, 14.08, 159, 385.1, 705, 176

(56) References Cited

U.S. PATENT DOCUMENTS

| | | | |
|---|---|---|---|
| 3,580,998 | * 5/1971 | Hammond et al. | 348/159 |
| 3,582,542 | * 6/1971 | Smierciak | 348/385.1 |
| 4,158,208 | * 6/1979 | Dischert | 348/176 |
| 4,961,211 | * 10/1990 | Tsugane et al. | 348/14.08 |
| 5,223,949 | * 6/1993 | Honjo | 358/426 |
| 5,371,535 | * 12/1994 | Takizawa | 348/14.1 |
| 5,488,482 | * 1/1996 | Ueda et al. | 348/402 |
| 5,579,060 | * 11/1996 | Elberbaum | 348/705 |

FOREIGN PATENT DOCUMENTS

| | | |
|---|---|---|
| KOKAI 62-179280 | 8/1987 | (JP) . |
| KOKAI 64-65989 | 3/1989 | (JP) . |

* cited by examiner

Primary Examiner—Chris Kelley
Assistant Examiner—Allen Wong
(74) Attorney, Agent, or Firm—Mattingly, Stanger & Malur, P.C.

(57) ABSTRACT

A video data compression/playback system efficiently compresses a plurality of video data pieces through inter-frame predictive-encoding. Mixed video data VSMIr composed of time-divided video data received by video input terminals are divided video data pieces each of which corresponding to video input terminals and the video data pieces are written into memories respectively by a memory control circuit for recording mode. The mixed video data written into the memories is read, a specified number of frames at a time. An MPEG encoding circuit performs inter-frame predictive-encoding for each specified number of frames.

13 Claims, 20 Drawing Sheets

FIG. 6
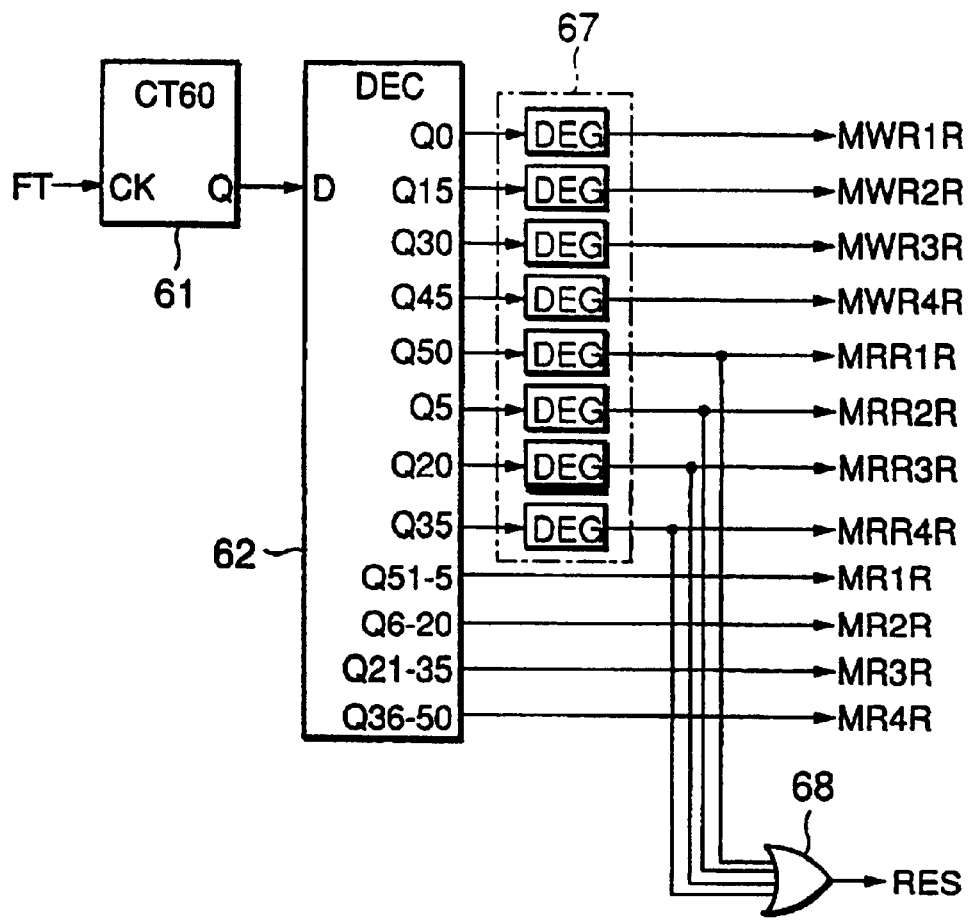
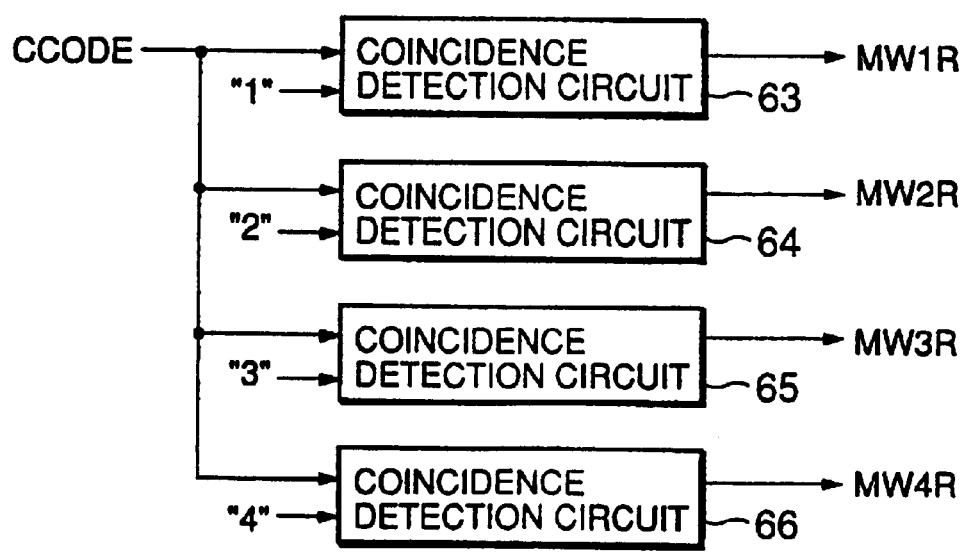

VIDEO DATA COMPRESSION SYSTEM, VIDEO RECORDING/PLAYBACK SYSTEM, AND VIDEO DATA COMPRESSION ENCODING METHOD

BACKGROUND OF THE INVENTION

1. Field of the Invention

This invention relates to a video data compression system, and more particularly to a compression encoding system for use in a video recording unit which sequentially switches video data obtained from a plurality of video cameras such as those used in a video surveillance system.

2. Description of the Related Art

Conventionally, a video surveillance system which records video from multiple video cameras (hereafter simply called cameras) onto a long-time recording time-lapse VTR has been used. This system uses a switcher to switch video from multiple cameras in a time-dividing manner.

Earlier patent disclosures dealing with this type of video surveillance systems are found in Japanese Patent Laid-Open Application No. Sho 64-65989 and Japanese Patent Laid-Open Application No. Hei 5-73312.

The system disclosed in Japanese Patent Laid-Open Application No. Sho 64-65989 synchronizes multiple cameras with the reference signal to eliminate the discontinuity of video signals at switching time.

It also synchronizes the VTR recording timing with the video signal switching signal to minimize unstable operation time. This results in a shorter video switching period, making high-density recording possible.

In addition, detecting at the time of playback, the camera identification signal superimposed on the video signal allows only the desired video to be selectively monitored.

The system disclosed in Japanese Patent Laid-Open Application No. Hei 5-73312 switches timely between a 2-system video selection means and a 2-system video signal synchronization means to enable a video surveillance system, which has cameras not under control of external synchronization signals or each controlled by its own synchronization method, to synchronize video signals for proper switching.

A system which switches multiple cameras in a time-division manner to combine their video signals into one mixed video signal is called a frame switcher. Many such systems are commercially available.

Today, digital video recording and playback systems which record and play back digital image data have become popular.

In general, image data to be recorded digitally is compressed to prevent the amount of data from increasing and therefore to allow the recording medium to be used for recording for a longer period of time.

Well-known image data compression techniques include JPEG (Joint Photographic Experts Group) and MPEG (Moving Pictures Experts Group).

Because these techniques are described in detail in many books, the following briefly gives the summary of their algorithms.

First, JPEG will be described

JPEG divides an image into multiple small blocks and converts each block into two-dimensional frequency components through DCT (Discrete Cosine Transform). It then reduces the amount of data through non-linear quantization and entropy encoding.

A high intra-frame correlation in the image means closer two-dimensional frequency components, thus increasing the encoding efficiency and reducing the amount of data while ensuring the picture image quality.

However, an image composed of fine patterns results in a lower intra-frame correlation and therefore decreases the compression efficiency. Thus, a compression ratio of up to 10:1 is required to ensure a reasonable JPEG image.

Next, MPEG will be described.

In addition to the technique used by JPEG described above, MPEG uses an inter-frame correlation to reduces the amount of data. More specifically, it finds changes between every two frames and performs DCT on the changes. This is called inter-frame predictive encoding.

For slow-moving video with little or no change between frames, MPEG produces a very small amount of data.

Even for fast-moving video, MPEG provides an extremely high predictive encoding efficiency because it detects motion vector between frames and motion compensation for them.

As a result, the image quality is not degraded at all even when the compression ratio is several scores to one and, therefore, a recording/playback system using the MPEG compression algorithm can record video data longer in time than JPEG.

SUMMARY OF THE INVENTION

Time lapse VTRs, which record analog video signals on magnetic tapes, have been used in most conventional video surveillance systems. It is also possible to configure a video surveillance system using digital recording system explained above.

That is, a system with only one camera digitizes the output video signals, reduces the amount of data by compressing data with MPEG, and records compressed data on a disk or tape.

A system with multiple cameras has an MPEG compression unit and a recording/playback unit installed for each camera to record digitized video signals sent from each camera.

The problem is that a video surveillance system with multiple MPEG compression encoding units is very expensive because the MPEG compression encoding unit is very expensive. It is therefore preferable that, as with the conventional video surveillance system, the system has only one compression encoding unit which compresses video signals sent from multiple cameras for recording.

However, compressing digitized mixed video signals generated by a frame switcher with MPEG poses the following problem.

In most cases, video generated by separate cameras has no correlation. This means that the amount of changes among video obtained by separate cameras is much larger than the amount of changes among video obtained by the same camera.

Therefore, a frequent switch among multiple cameras in the time divided manner affects inter-frame predictive encoding. Video data cannot be compressed efficiently for recording.

This invention seeks to solve the problems associated with the prior art described above. It is an object of this invention is to provide a video data compression system, video recording/playback system, and video data compression encoding method which efficiently compress multiple video data items through predictive encoding.

To solve the above problems, a first embodiment of this invention is a video data compression system which compresses mixed video data generated by mixing a plurality of video data items in a time-divided manner, wherein the mixed video data is compressed by performing inter-frame or inter-field predictive encoding for each of the plurality of video data items.

For example, such a system comprises first storage means for storing the mixed video data; first control means for controlling writing and reading the mixed video data to and from the first storage means; and predictive encoding means for performing predictive encoding among a plurality of images of the mixed video data.

The first control means writes the mixed video data into the first storage means, the mixed video data being divided into the plurality of video data pieces, and sequentially reads the mixed video data, a plurality of images at a time, for each of the plurality of video data items from the first storage means and wherein the predictive encoding means performs predictive encoding among a plurality of images of video data sequentially read, a plurality of images at a time, from the first storage means.

In addition, when the mixed video data is composed of the plurality of video data items, each of the plurality of video data items sequentially appearing for a predetermined number of images, the predictive encoding means performs predictive encoding on a plurality of images appearing at an interval of a number of images, the number being a product of the predetermined number of images, the number of the plurality of video data items, and a natural number.

The first embodiment of this invention compresses mixed video data, composed of a plurality of video data items, through predictive encoding for each of the plurality of video data items, thus efficiently compressing the mixed video data.

A second embodiment of this invention is a video data compression system which compresses a plurality of video data items, comprising video data acquisition means for sequentially acquiring a predetermined number of video data images from the plurality of video data items on a frame basis or on a field basis; and predictive encoding means for compressing the mixed video data by performing predictive-encoding among the images of video data images sequentially acquired by the video data acquisition means.

For example, the video data acquisition means comprises first storage means for storing the plurality of video data items; and first control means for controlling writing and reading the plurality of video data items to and from the first storage means.

The first control means divides each of the plurality of video data items at an interval of a predetermined number of images, writes the divided video data into the first storage means, and sequentially reads the video data, a plurality of images at a time, for each of the plurality of video data pieces from the first storage means and the predictive encoding means performs predictive encoding among the plurality of images of video data sequentially read, a plurality of images at a time, from the first storage means.

The second embodiment of this invention sequentially acquires a predetermined number of video data images from a plurality of video data items and compresses the video data by performing predictive encoding among a plurality of images of the acquired video data, thus compressing the plurality of video data items efficiently.

BRIEF DESCRIPTION OF THE DRAWINGS

FIG. 6 is a diagram showing the outline of the memory control circuit for recording mode 13 shown in FIG. 1.

DETAILED DESCRIPTION OF PREFERRED EMBODIMENTS

A first embodiment according to this invention will now be described with reference to the attached drawings.

Figure 1:
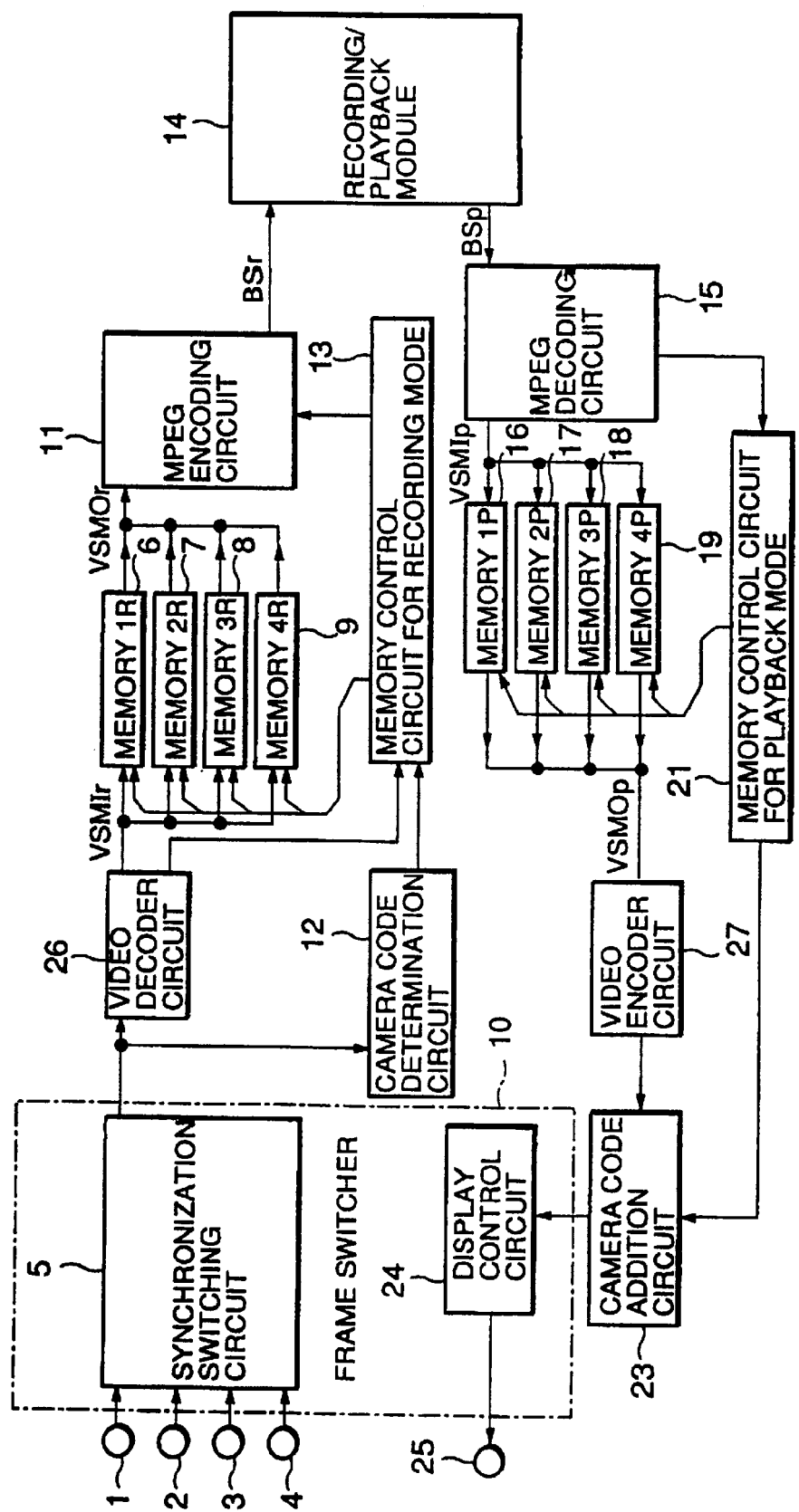
FIG. 1 is a block diagram showing the outline of a video data recording/playback system used in a first embodiment of this invention.

FIG. 1 is a block diagram showing the outline of a video data recording/playback system used in the first embodiment according to this invention.

In the figure, numbers 1 to 4 refer to video input terminals, number 5 refers to a synchronization switching circuit, numbers 6–9 and numbers 16–19 refer to memory, number 11 refers to an MPEG encoding circuit, number 12 refers to a camera code determination circuit, number 13 refers to a memory control circuit for recording mode, number 14 refers to a recording/playback module, number 15 refers to an MPEG decoding circuit, number 21 refers to a memory control circuit for playback mode, number 23 refers to a camera code addition circuit, number 24 refers to a display control circuit, number 25 refers to a video output terminal, number 26 refers to a video decoder circuit, and number 27 refers to a video encoder circuit. Number 10 refers to a frame switcher composed of the synchronization switching circuit 5 and the display control circuit 24.

The video input terminals 1–4 receive analog video signals from the cameras not shown in the figure.

The synchronization switching circuit 5 converts the four analog video signals received by the video input terminals 1–4 to digital signals, synchronizes and sequentially switches the four video signals, and outputs them as one mixed video signal. In addition, the circuit adds camera codes each identifying the four video signals to the corresponding part of the mixed video signal.

The video decoder circuit 26 converts the mixed video signal from the synchronization switching circuit 5 to video data VSMIr which is composed of three signals: a luminance signal and two color difference signals composed of the number of picture elements corresponding to the MPEG encoding format.

The camera code determination circuit 12 detects the camera codes in the mixed video signal output from the synchronization switching circuit 5.

Memory (1R) 6 to memory (4R) 9 store the corresponding part of the video data VSMIr.

The memory control circuit for recording mode 13 controls memory containing the video data VSMIr from the video decoder circuit 26 according to the camera codes determined by the camera code determination circuit 12.

In this embodiment, the video data VSMIr is controlled according to the camera codes as follows. That is, the memory (1R) 6 to the memory (4R) 9 are controlled such that the video data corresponding to the video signal entered from the video input terminals 1 is stored in the memory (1R) 6, the video data corresponding to the video signal entered from the video input terminals 2 is stored in the memory (2R) 7, the video data corresponding to the video signal entered from the video input terminals 3 is stored in the memory (3R) 8, and the video data corresponding to the video signal entered from the video input terminals 4 is stored in the memory (4R) 9.

The memory control circuit for recording mode 13 also sequentially accesses the memory (1R) 6 to the memory (4R) 9 to read any frames of video data VSMIr stored in each memory.

In this way, the video data VSMIr from the video decoder circuit 26 is converted to video data VSMOr where sequence of frames has been changed. The video data VSMOr will consist a sequence of frames each of which corresponding to the signals received by video input terminals 1 to 4.

The MPEG encoding circuit 11 encodes the video data VSMOr using MPEG format and outputs it as an MPEG bit stream BSr.

At this time, the MPEG encoding circuit 11 adds camera code data to the bit stream BSr according to the instruction generated by the memory control circuit for recording mode 13. The camera code data is that of the video signals from which VSMOr was generated, which was in turn converted to the bit stream BSr.

The recording/playback module 14 records the bit stream BSr output from the MPEG coding circuit 11 on a recording medium such as a disk or tape. It also plays back the bit stream from the recording medium and outputs the played-back bit stream BSp.

The MPEG decoding circuit 15 decodes the bit stream BSp played back by the recording/playback module 14 and converts it to video data VSMIp composed of the luminance signal and the color difference signals. It also detects the camera codes added to the bit stream BSp.

The memory (1P) 16 to the memory (4P) 19 each store the corresponding part of the video data VSMIp output from the MPEG decoding circuit 15.

The memory control circuit for playback mode 21 controls memory to contain the video data VSMIp output from the MPEG decoding circuit 15 according to the camera codes detected by the MPEG decoding circuit 15.

In this embodiment, the video data VSMIp decoded by the MPEG decoding circuit 15 is controlled according to the camera codes as follows. That is, the memory (1P) 16 to the memory (4P) 19 are controlled such that the video data corresponding to the video signal entered from the video input terminals 1 is stored in the memory (1P) 16, the video data corresponding to the video signal entered from the video input terminals 2 is stored in the memory (2P) 17, the video data corresponding to the video signal entered from the video input terminals 3 is stored in the memory (3P) 18, and the video data corresponding to the video signal entered from the video input terminals 4 is stored in the memory (4P) 19.

The memory control circuit for playback mode 21 also accesses the memory (1P) 16 to the memory (4P) 19 sequentially to read video data VSMIp sequentially, one frame at a time. This way, it generates video data VSMOp composed of frames generated from the video data corresponding to the video input terminals 1–4, with a frame from a terminal sequentially followed by a frame from the next.

The video encoder circuit 27 converts the video data VSMOp to the composite video signal.

The camera code addition circuit 23 adds the corresponding camera code to the composite video signal, converted by the video encoder circuit 27, during the vertical blanking interval according to the instruction from the memory control circuit for playback mode 21.

In a similar manner as the reproduction process of the conventional frame switcher, the display control circuit 24 determines the camera code and outputs the video signal from the video output terminal 25 so that only the video of the desired camera may be selectively displayed.

The video output terminal 25 is connected to a monitor, not shown in the figure, on which video is displayed.

Next, the components of the video data recording/playback system shown FIG. 1 are described in more detail.

First, the synchronization switching circuit 5 will be described.

Figure 2:
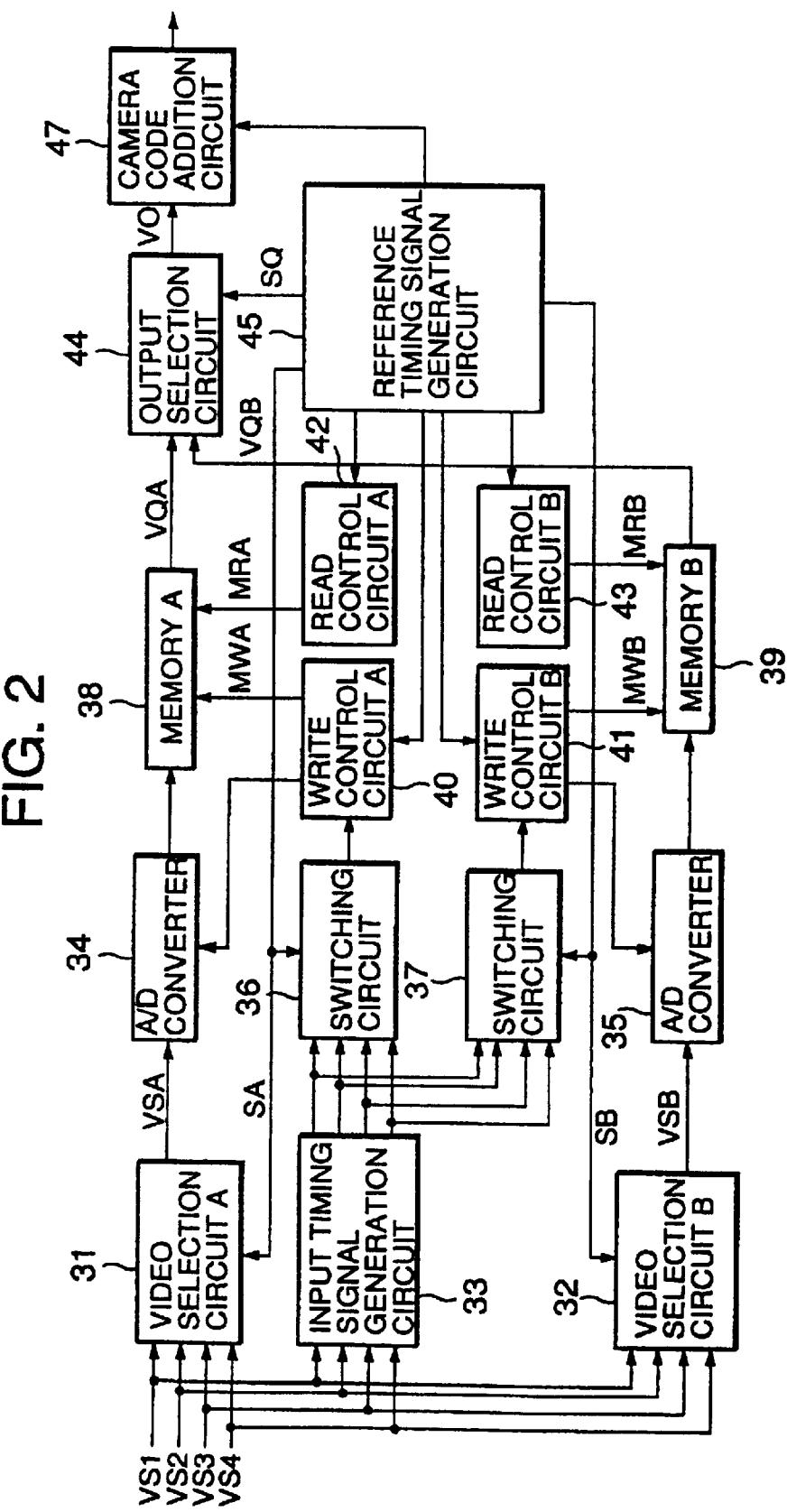
FIG. 2 is a diagram showing the outline of the synchronization switching circuit 5 shown in FIG. 1.

FIG. 2 is a diagram showing the outline of the synchronization switching circuit 5.

In this figure, number 31 refers to a video selection circuit A, number 32 refers to a video selection circuit B, number 33 refers to an input timing signal generation circuit, numbers 34 and 35 refer to A/D converters, numbers 36 and 37 refer to switching circuits, number 38 refers to a FIFO (First IN First Out) memory A, number 39 refers to a FIFO memory B, number 40 refers to a write control circuit A, number 41 refers to a write control circuit B, number 42 refers to a read control circuit A, number 43 refers to a read control circuit B, number 44 refers to an output selection circuit, number 45 refers to a reference timing signal generation circuit, and number 47 refers to a camera code addition circuit.

The video selection circuit A 31 selects one of analog video signals VS1–VS4 entered from the video input terminals 1–4 according to a control signal SA from the reference timing signal generation circuit 45.

The video selection circuit B 32 selects one of analog video signals VS1–VS4 entered from the video input terminals 1–4 according to a control signal SB from the reference timing signal generation circuit 45.

The A/D converter 34 converts the analog video signal selected by the video selection circuit A 31 to the digital signal.

The A/D converter 35 converts the analog video signal selected by the video selection circuit B 32 to the digital signal.

The video signal output from the A/D converter 34 is written into the FIFO memory A 38 according to the control signal MWA sent from the write control circuit A 40, and the video signal VQA written into the FIFO memory A 38 is read according to the control signal MRA sent from the read control circuit A 42.

The video signal output from the A/D converter 35 is written into the FIFO memory B 39 according to the control signal MWB sent from the write control circuit B 41, and the video signal VQB written into the FIFO memory B 39 is read according to the control signal MRB sent from the read control circuit B 43.

The output selection circuit 44 selects one of the video signal VQA read from the FIFO memory A 38 and the video signal VQB read from the FIFO memory B 39 according to the control signal SQ sent from the reference timing signal generation circuit 45.

The reference timing signal generation circuit 45 uses an internal crystal oscillator and so on to generate the 4fsc clock signal with the frequency that is four times as high as that of the color sub-carrier. It supplies control signals generated based on the 4fsc clock signal.

The camera code addition circuit 47 generates camera codes, based on the video selection information from the video selection circuit A 31, video selection circuit B 32, and output selection circuit 44, and adds the camera codes to the output video signal VO from the output selection circuit 44 during the vertical blanking interval.

The input timing signal generation circuit 33 separates the horizontal sync signal and the vertical sync signal from the video signals VS1–VS4 received by the video input terminals 1–4. Based on the separated horizontal sync signal and the vertical sync signal, the input timing signal generation circuit generates the start timing and the end timing of a frame of the video signal. For each of the video signals VS1–VS4, the input timing signal generation circuit also generates the 4fsc clock signal which is in phase lock with the sub-carrier of the signal.

The start timing and the end timing of a frame of the signal and the 4fsc clock signal, which are generated for each of the analog video signals VS1–VS4, are called the input timing of the signal.

The switching circuit 36 selects and outputs one of input timings from those of each of video signals VS1–VS4, generated by the input timing signal generation circuit 33, according to the control signal SA sent from the reference timing signal generation circuit 45.

The switching circuit 37 selects and outputs one input timing from those of each of video signals VS1–VS4, generated by the input timing signal generation circuit 33, according to the control signal SB sent from the reference timing signal generation circuit 45.

The write control circuit A 40 generates the control signal MWA which causes one frame of the video signal to be written into the FIFO memory A 38 according to the control signal from the reference timing signal generation circuit 45 and the input timing from the switching circuit 36. The circuit also supplies the 4fsc clock signal, included in the input timing, to the A/D converter 34.

The write control circuit B 41 generates the control signal MWB which causes one frame of the video signal to be written into the FIFO memory B 39 according to the control signal from the reference timing signal generation circuit 45 and the input timing from the switching circuit 37. The circuit 41 also supplies the 4fsc clock signal, included in the input timing, to the A/D converter 35.

The read control circuit A 42 generates the control signal MRA specifying the timing at which the video signal is to be read from the FIFO memory A 38 according to the control signal from the reference timing signal generation circuit 45.

The read control circuit B 43 generates the control signal MRB specifying the timing at which the video signal is to be read from the FIFO memory B 39 according to the control signal from the reference timing signal generation circuit 45.

Next, the operation of the synchronization switching circuit 5 shown in FIG. 2 is described.

In the following example, it is assumed that the video signals VS1–VS4 received by the input terminals 1–4 are asynchronous with each other (The vertical sync is out of phase with each other)

Figure 3:
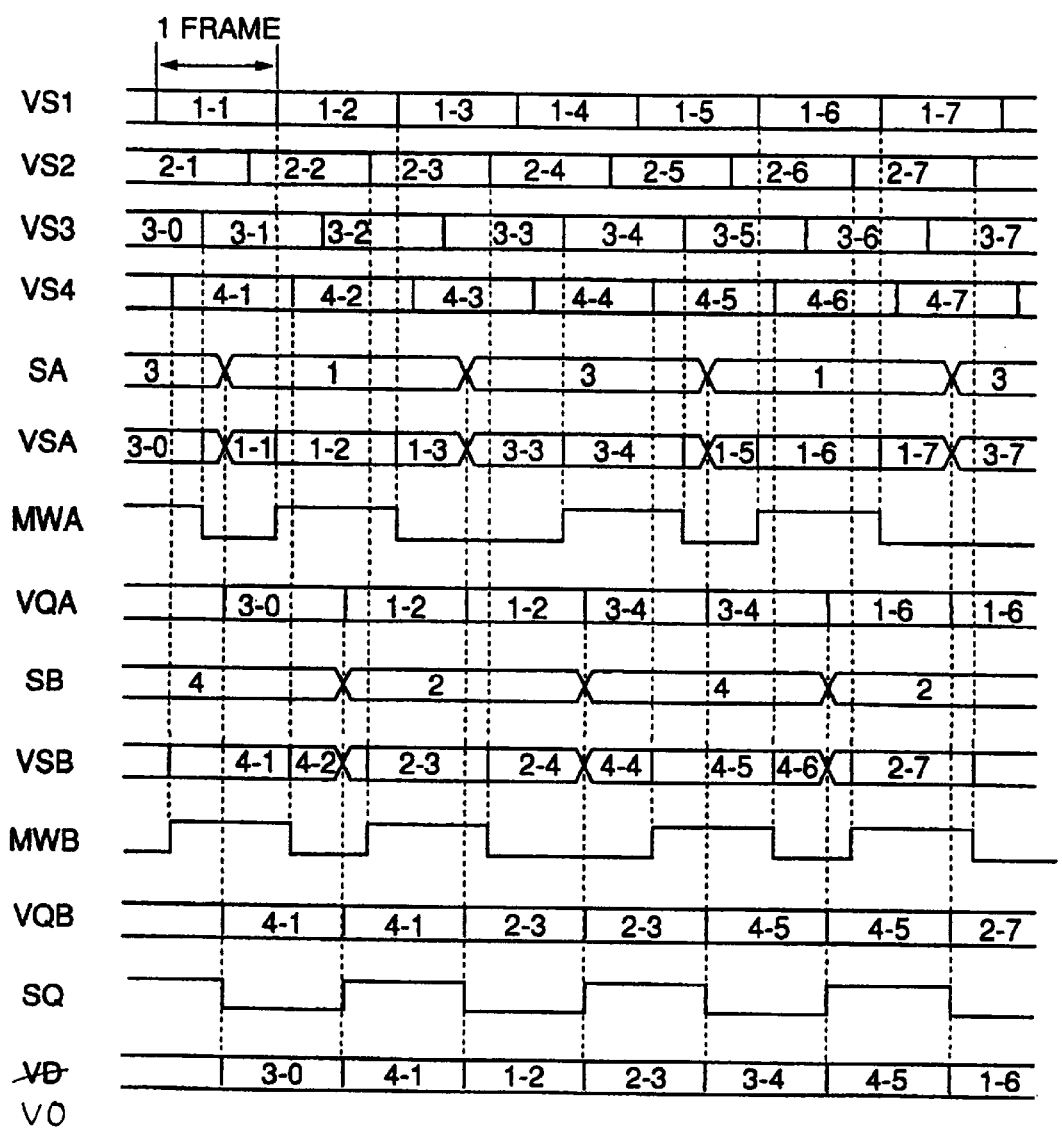
FIG. 3 is a timing diagram showing the operation of the synchronization switching circuit 5 shown in FIG. 2.

FIG. 3 is a timing diagram describing the operation of the synchronization switching circuit 5 shown in FIG. 2.

In FIG. 3, 1-1 to 1-7 are the periods of one frame of the video signal VS1, 2-1 to 2-7 are the periods of one frame of the video signal VS2, 3-0 to 3-7 are the periods of one frame of the video signal VS3, and 4-1 to 4-7 are the periods of one frame of the video signal VS4.

The reference timing signal generation circuit 45 generates the control signal SA which alternately selects the video signal VS1 and the video signal VS3 for each two-frame period.

Therefore, the video signal VSA selected by the video selection circuit A 31 is a mixed video signal in which the video signal VS1 and the video signal VS3 are alternated each 2-frame period as shown in FIG. 3.

After the video signal VSA selected by the video selection circuit A 31 is switched, the write control circuit A 40 generates the control signal MWA which causes the digital video data, corresponding to the video signal from the first start timing to the end timing of the frame (one-frame video signal), to be written into the FIFO memory A 38, This allows one frame of the video signal VS1 and one frame of video signal VS3 to be written alternately into the FIFO memory A 38.

One frame of the video signal is read from the FIFO memory A 38 according to the control signal from the read control circuit A 42. Thus, as shown in FIG. 3, the video signal VQA in which one frame of the video signal VS1 and one frame of video signal VS3 are alternately synchronized for each two frames.

The operation described above is also performed in the circuits in side B (video selection circuit B 32, A/D converter 35, FIFO memory B 39, switching circuit 37, write control circuit B 41, read control circuit B 43).

Thus, as shown in FIG. 3, for the video signal VQB which is output from the FIFO memory B 39, one frame of the video signal VS2 and one frame of video signal VS4 are alternately synchronized for each two frames.

The reference timing signal generation circuit 45 generates the control signal SQ which causes the digital video data VQA and VQB to be switched for each one-frame period.

This signal causes the video signal VO from the output selection circuit 44 to be synchronized with digitized video signal VS1–VS4, and the video signal becomes a mixed video signal composed of signals switched sequentially every frame.

After that, the camera code addition circuit 47 adds camera codes to appropriate locations within the vertical blanking interval to indicate the video signal, VS1 to VS4, corresponding to the mixed video signal immediately following the blanking interval.

Figure 4:
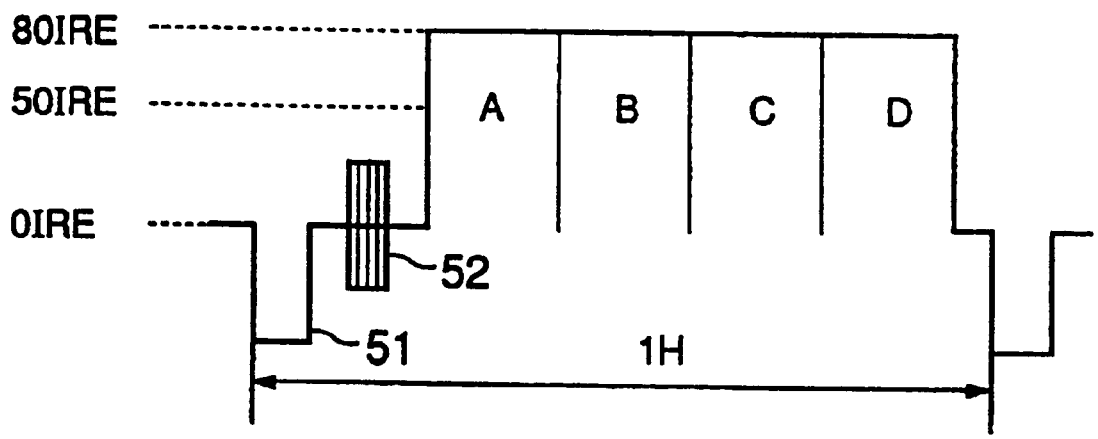
FIG. 4 is a diagram explaining the waveform of the signal used for a camera code included in a video signal output from the synchronization switching circuit 5 shown in FIG. 2.

FIG. 4 shows an example of the video signal to which the camera code is added.

FIG. 4 shows a mixed video signal in the 1H (horizontal sync) period within the vertical blanking interval. Number 51 is the horizontal sync signal, number 52 is the color burst signal, and A–D are data signals.

Setting A–D in the figure high (for example, 80IRE) or low (for example, 0IRE) enables them to be used as the 4-bit data indicating a camera number.

In this embodiment, the 4-bit camera code is "1" for the video signal VS1, "2" for the video signal VS2, "3" for the video signal VS3, and "4" for the video signal VS4.

By performing the operation described above, the synchronization switching circuit 5 synchronizes four asynchronous video signals, adds camera codes to them, and outputs the signals in the time-division manner Next, the camera code determination circuit 12 will be described.

Figure 5:
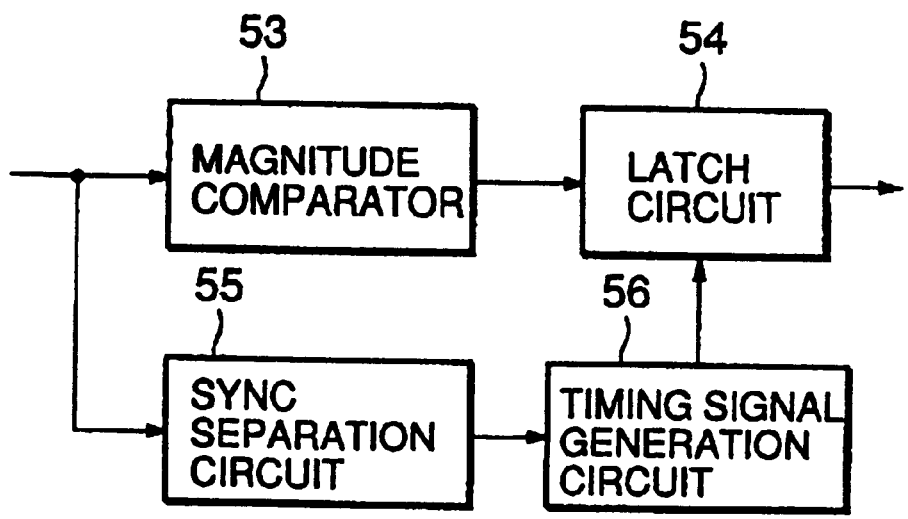
FIG. 5 is a diagram showing the outline of the camera code determination circuit 12 shown in FIG. 1.

FIG. 5 is a diagram showing the outline of the camera code determination circuit 12.

In the figure, number 53 refers to a magnitude comparator, number 54 refers to a latch circuit, number 55 refers to a sync separation circuit, and number 56 refers to a timing signal generation circuit.

The sync separation circuit 55 separates and outputs the horizontal sync signal and the vertical sync signal from the mixed video signal sent from the sync switching circuit 5.

The timing signal generation circuit 56 generates the detection timing of the camera code data signal (A–D in FIG. 4) based on the horizontal sync signal and the vertical sync signal sent from the sync separation circuit 55.

The magnitude comparator 53 compares the mixed video signal generated from the synchronization switching circuit 5 against the threshold level (for example, 50IRE) to determine whether the signal is high or low. The determined signal is latched with the detection timing generated by the timing signal generation circuit 56 and is held for about one frame until the next camera code is latched.

Next, the memory (1R) 6 to memory (4R) 9 will be explained.

The memory (1R) 6 to memory (4R) 9 are FIFO memories to and from which data is written and read at the same time. Upon receiving Write Reset, the write address is reset and, only when the Write Enable is high, data is written into the memory while the write address is incremented.

Similarly, upon receiving Read Reset, the read address is reset and, only when the Read Enable is high, data is read from the memory while the read address is incremented.

Next, the memory control circuit for recording mode 13 will be described.

FIG. 6 is a diagram showing the outline of the memory control circuit for recording mode 13.

In this figure, number 61 refers to a base-60 counter circuit, number 62 refers to a decoder circuit, numbers 63–66 refer to coincidence detection circuits, number 67 refers to an edge detection circuit (DEG) group, and number 68 refers to an OR circuit.

The base-60 counter circuit 61 is incremented on the rising edge of the clock signal sent to the CK terminal.

The decoder circuit 62 sets the predetermined terminal output high when the count value of the D terminal has reached the specified value.

In this embodiment, the output "Qk (k is a natural number)" is high when the count value of the D terminal is "k". For example, the output "Q0" is high when the count value of the D terminal is 0.

The output "Qk–l (k and l are natural numbers)" remains high from the time the count value of the D terminal becomes k to the time the count becomes 1. For example, the output "Q51–5" remains high from the time the count value of the D terminal becomes "51" to the time the count value becomes "5".

The coincidence detection circuits 63–66 are high when two input values match.

Each of the edge detection circuits (DEG) of the edge detection circuit group 67 is high only during one-clock period after the input pulse goes low.

Next, the operation of the memory control circuit for recording mode 13 shown in FIG. 6 will be described.

First, the counter circuit 61 is incremented in synchronization with the frame reference timing (FT) of the video data VSMIr sent from the video decoder circuit 26. When the count value reaches 59, the counter circuit is reset the next time it is incremented, thus generating the reference count value for controlling memory on a 60-frame basis.

Next, the decoder circuit 62 sets the output terminals "Q0", "Q15", "Q30", and "Q45" high when the reference count value generated by the counter circuit 61 becomes "0", "15", "30", and "45", respectively.

Upon receiving these decode outputs, the edge detection circuits of the edge detection circuit group 67 output the high-level pulse only for the one-clock period during which the decode output falls. This pulse is supplied to the memory (1R) 6–memory (4R) 9 as the write reset signals (MWR1R–MWR4R shown in FIG. 6).

Similarly, the decoder circuit 62 sets the output terminals "Q50", "Q5", "Q20", and "Q35" high when the reference count value generated by the counter circuit 61 becomes "50", "5", "20", and "35", respectively.

Upon receiving these decode outputs, the edge detection circuits of the edge detection circuit group 67 output the high-level pulse only for the one-clock period during which the decode output falls. This pulse is supplied to the memory (1R) 6–memory (4R) 9 as the read reset signals (MRR1R–MRR4R shown in FIG. 6).

The decoder circuit 62 outputs the high-level pulse from the output terminal "Q51–5" from the time the counter value becomes "51" to the time the count value becomes "5". This pulse is supplied to the memory (1R) 6 as the Read Enable signal (MR1R shown in FIG. 6).

Similarly, the decoder circuit 62 outputs the high-level pulse from the output terminals "Q6–20", "Q21–35", and "Q36–50" from the time the counter value generated by the counter circuit 61 becomes "6" to the time the count value becomes "20", from the time the counter value becomes "21" to the time the count value becomes "35", and from the time the counter value becomes "36" to the time the count value becomes "50", respectively. This pulse is supplied to the memory (2R) 7–memory (4R) 9 as the Read Enable signal (MR2R and MR4R shown in FIG. 6).

On the other hand, the coincidence detection circuit 63 sets the output high only when the camera code CCODE determined by the camera code determination circuit 12 is "1". The output of this coincidence detection circuit 63 is supplied to the memory (1R) 6 as the Write Enable signal (MW1R shown in FIG. 6).

The coincidence detection circuit 64 sets the output high only when the camera code CCODE determined by the camera code determination circuit 12 is "2". The output of this coincidence detection circuit 64 is supplied to the memory (2R) 7 as the Write Enable signal (MW2R shown in FIG. 6).

The coincidence detection circuit 65 sets the output high only when the camera code CCODE determined by the camera code determination circuit 12 is "3". The output of this coincidence detection circuit 65 is supplied to the memory (3R) 8 as the Write Enable signal (MW3R shown in FIG. 6).

The coincidence detection circuit 66 sets the output high only when the camera code CCODE determined by the camera code determination circuit 12 is "4". The output of this coincidence detection circuits 66 is supplied to the memory (4R) 9 as the Write Enable signal (MW4R shown in FIG. 6).

Figure 7:
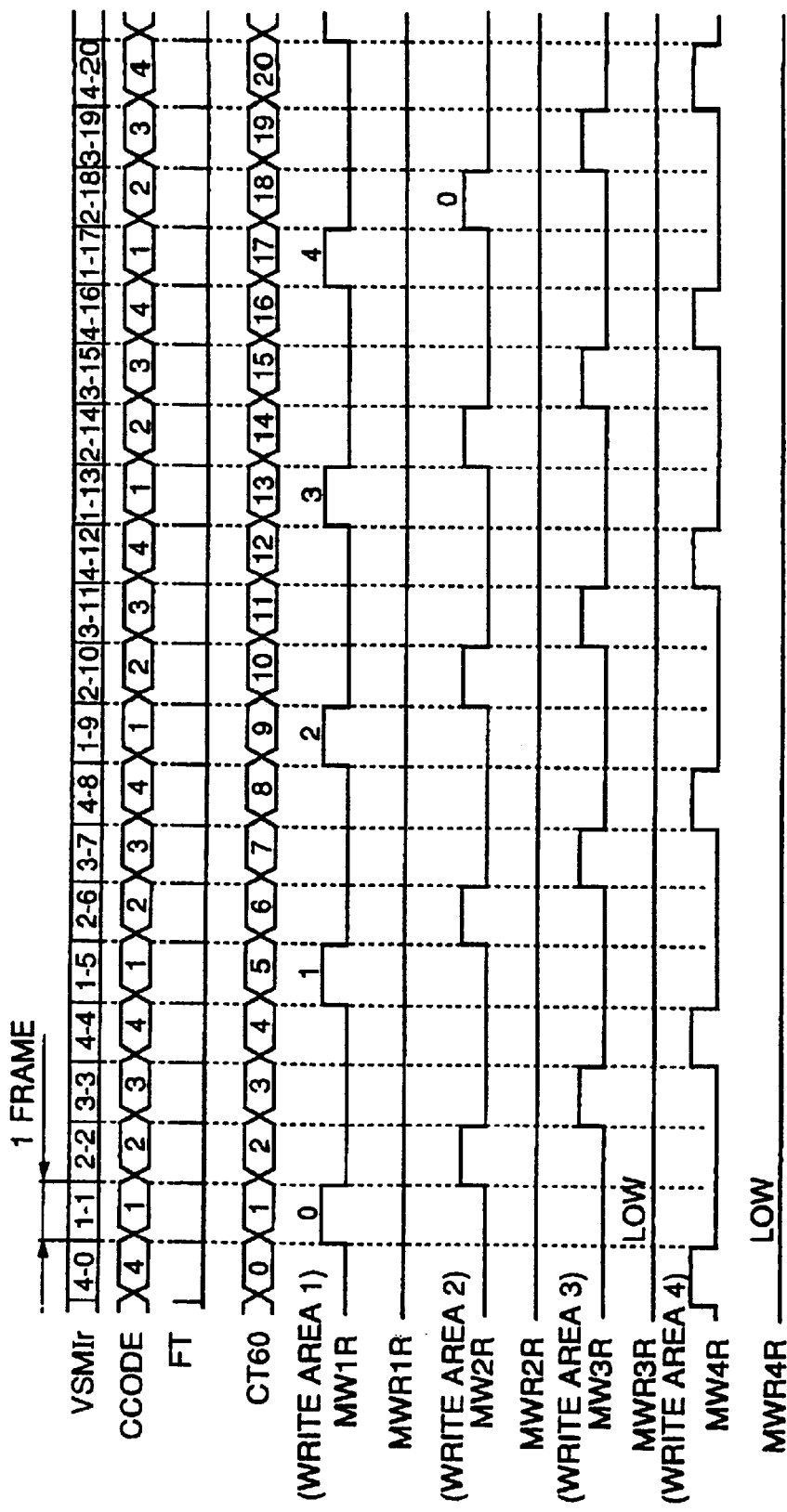
FIG. 7 is a timing diagram showing the operation of the memory control circuit for recording mode 13 shown in FIG. 6.
Figure 8:
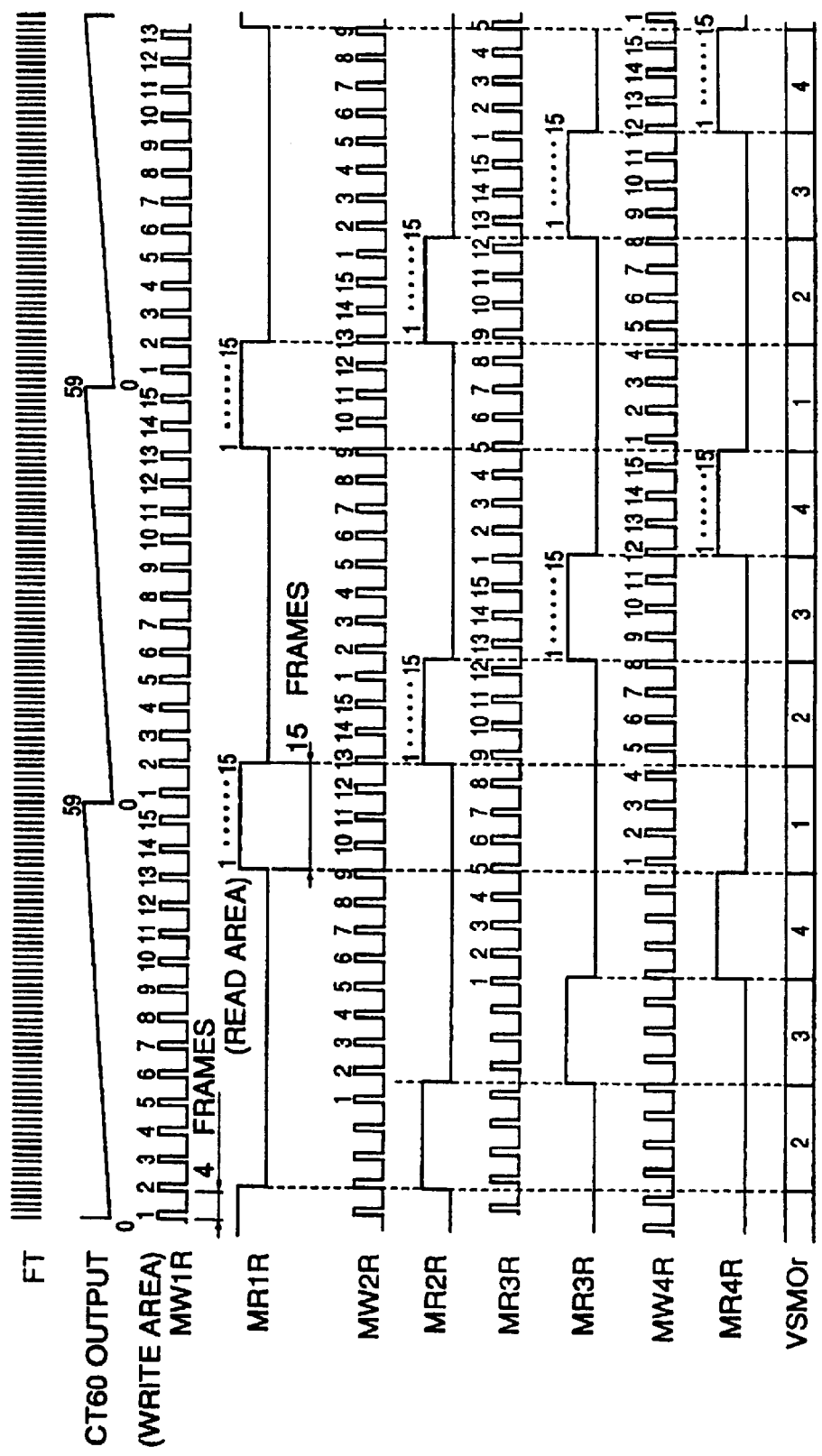
FIG. 8 is a timing diagram showing the operation of the memory control circuit for recording mode 13 shown in FIG. 6.

FIGS. 7 and 8 are the timing diagrams showing the operation of the memory control circuit for recording mode 13 described above.

FIG. 7 shows the wave-forms of the components while the base-60 counter circuit 61 increments from 0 to 20, that is, for the duration of about 21 frames.

In this figure, it is assumed that "write area 1", which represents a plurality of write addresses in the memory (1R) 6, may contain one frame of video data.

Therefore, the value of "write area 1" is incremented by 1 each time one frame of data is written and is reset to 0 by the Write Reset signal MWR1R.

Similarly, "write area 2", "write area 3", and "write area 4" represent a plurality of write addresses in the memory (2R) 7, memory (3R) 8, and memory (4R) 9, respectively.

As shown in FIG. 7, each of the Write Enable signals, MW1R–MW4R, goes high once for 4frames because the camera code CCODE changes every 4 frames.

When the value CT60 of the base-60 counter circuit 61 changes from 0 to 1, the Write Reset signal MWR1R of the memory (1R) 6 goes high and the write address is reset.

Then, during the next frame period (while CT60 is 1), the "1-1" portion of the video data VSMIr (one frame of the video signal VS1) is written into area 0 of the memory (1R) 6.

Thereafter, one frame of the video signal VS1 is written from the video data VSMIr into the memory (1R) 6 every 4 frames.

Similarly, when CT60 changes from 15 to 16, the Write Reset signal MWR2R of the memory (2R) 7 goes high and the write address of the memory (2R) 7 is reset.

Then, during the next frame period (while CT60 is 18), the "2-18" portion of the video data VSMIr (one frame of the video signal VS2) is written into area 0 of the memory (2R) 7.

Thereafter, one frame of the video signal VS2 is written from the video data VSMIr into the memory (2R) 7 every 4 frames.

The Write Reset signal MWR3R of the memory (3R) 8 goes high at the next 15th frame, and the Write Reset signal MWR4R of the memory (4R) 9 goes high at the next 15th frame.

In a similar manner, one frame of video signal VS3 is written into the memory (3R) 8, and one frame of video signal VS4 is written into the memory (4R) 9, sequentially beginning with area 0, every 4 frames.

FIG. 8 shows the wave-forms of the components while the base-60 counter circuit 61 wraps around a little less than three times, that is, for the duration of about 170 frames.

To avoid confusion, VSMIr and CCODE are omitted in this figure. The count values CT60 of the base-60 counter circuit 61 are indicated by analog values.

When CT60 changes from "50" to "51", the Read Reset signal MRR1R of the memory (1R) 6 goes high (not shown in the figure) and the read address is reset.

For the next 15 frames (the period during which CT60 goes from "51" to "5"), the Read Enable signal MR1R remains high to allow data to be read sequentially from areas 0–15 of the memory (1R) 6.

During the read operation, data is also written every four frames. Because there is sufficient time lag (50 frames in this example) between the Write Reset signal MWR1R and the Read Reset signal MRR1R, the read address always lags behind the write address. That is, new data and old data are never mixed in one read period (for the duration of 15 frames).

The operation of each of the memory (2R) 7–the memory (4R) 9 is almost the same as that of the memory (1R) 6, except that the Write Reset signal, Read Reset signal, and Read Enable signal are about 15 frames out of phase as shown in FIG. 8.

The Output Enable signal from each of the memory (1R) 6–memory (4R) 9 is connected to the Read Enable signal to put the output in the high impedance state when the Read Enable signal is low.

Therefore, video data VSMOr is output at a time sequentially from the memory (1R) 6–memory (4R) 9 every 15 frames as shown in FIG. 8.

By performing the operation described above, the memory control circuit for recording mode 13 converts the video data VSMIr of the video signal VS1–VS4 from the video decoder circuit 26, which is sequentially time-divided for each frame, to the video data VSMOr of the video signal VS1–VS4 which is sequentially time-divided for each 15 frames.

Next, the MPEG encoding circuit 11 will be described.

Figure 9:
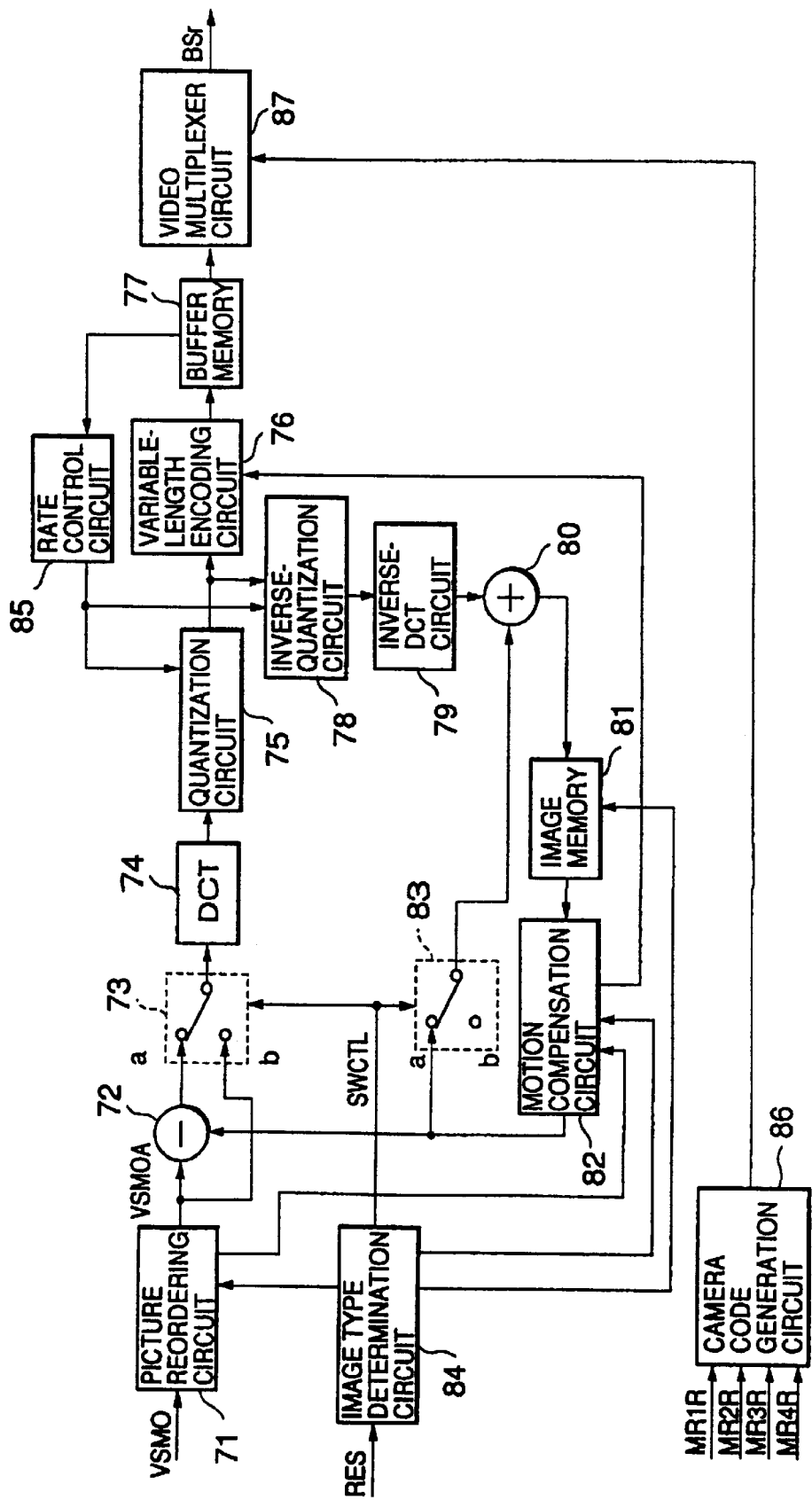
FIG. 9 is a diagram showing the outline of the MPEG encoding circuit 11 shown in FIG. 1.

FIG. 9 is a diagram showing the outline of the MPEG encoding circuit 11 shown in FIG. 1.

In the figure, number 71 refers to a picture reordering circuit, number 72 refers to a subtracter, numbers 73 and 83 refer to switching circuits, number 74 refers to a DCT (Discrete Cosine Transform) circuit, number 75 refers to a quantization circuit, number 76 refers to a variable-length encoding circuit, number 77 refers to a buffer memory, number 78 refers to an inverse-quantization circuit, number 79 refers to an inverse DCT circuit, number 80 refers to an addition circuit, number 81 refers to an image memory, number 82 refers to a motion compensation circuit, number 84 refers to a picture type decision circuit, number 85 refers to a rate control circuit, number 86 refers to a camera code generation circuit, and number 87 refers to a video multiplexer.

MPEG performs encoding on three types of pictures repeatedly: Intra-frame encoding I (Intra-coded) picture, forward inter-frame predictive encoding P (Predictive-coded) picture, and bi-directionally inter-frame predictive encoding B (Bi-directionally predictive-coded) picture.

The picture type determination circuit 84 is a counter circuit which controls operation such that processing is performed periodically according to the picture type. This counter circuit, reset by the RES signal (signal generated from the OR circuit 68 in FIG. 6) from the memory control circuit for recording mode 13, sends the control signal to each part according to the picture once for each GOP (Group of Pictures).

The picture reordering circuit 71 re-orders the pictures of the video data VSMOr according to the control signal from the picture type determination circuit 84.

The switching circuit 73 selects one of two types of data—image data for intra-frame encoding and difference data for inter-frame encoding—according to the control signal SWCTL from the picture type determination circuit 84.

Video data selected through switching is converted into a spatial frequency domain, one block (8 elements×8 lines) at a time, by the DCT conversion circuit 74. The converted data is sent to the quantization circuit 75 for quantization with the use of a quantization matrix.

The data quantized by the quantization circuit 75 is coded into variable-length data by the variable-length encoding circuit 76 with the use of motion vectors from the motion compensation circuit 82 and encoding mode information, stored in the buffer memory 77, and then output to the video multiplexer circuit 87.

The rate control circuit 85 sets up a quantization scale according to the amount of data in the buffer memory 77 and sends it to the quantization circuit 75 and the inverse-quantization circuit 78.

The data quantized by the quantization circuit 75, locally decoded by the inverse-quantization circuit 78 and the inverse-DCT circuit 79, is stored in the image memory 81. Note that the B picture data, which is not used as reference images, is not written into the image memory 81.

This write control is performed according to the control signal from the picture type determination circuit 84.

The switching circuit 83, provided for selecting between intra-frame decoding and inter-frame decoding, operates on the control signal from the picture type determination circuit 84.

The motion compensation circuit 82 detects input video motion vectors based on the video data from the picture reordering circuit 71 and performs motion compensation for the image data in the image memory 81. At this time, the motion compensation circuit 82 selects the best compensation from forward, backward, and bi-directional motion compensations and, when the inter-frame correlation is very small, outputs the value of "0".

The circuit switches processing on P-picture data according to the image type. For example, it performs only forward compensation. This is determined by the control signal from the picture type determination circuit 84.

The camera code generation circuit 86 generates the corresponding camera code according to the Read Enable signal (MR1R–MR4R shown in FIG. 6) sent from the memory control circuit for recording mode 13.

For example, when the Read Enable signal MR1R is high, as it is clear from the timing diagram of FIG. 8, the video data corresponding to the video signal VS1 received by the video input terminals 1 is output as the video data VSMOr. Thus, in this case, the camera code of "1" is generated.

This camera code is added by the video multiplexer circuit 87 as the user data of the GOP layer defined by the MPEG standard. Then, the camera code and coded video data from the buffer memory 77 are output as the MPEG bit stream BSr.

Figure 10:
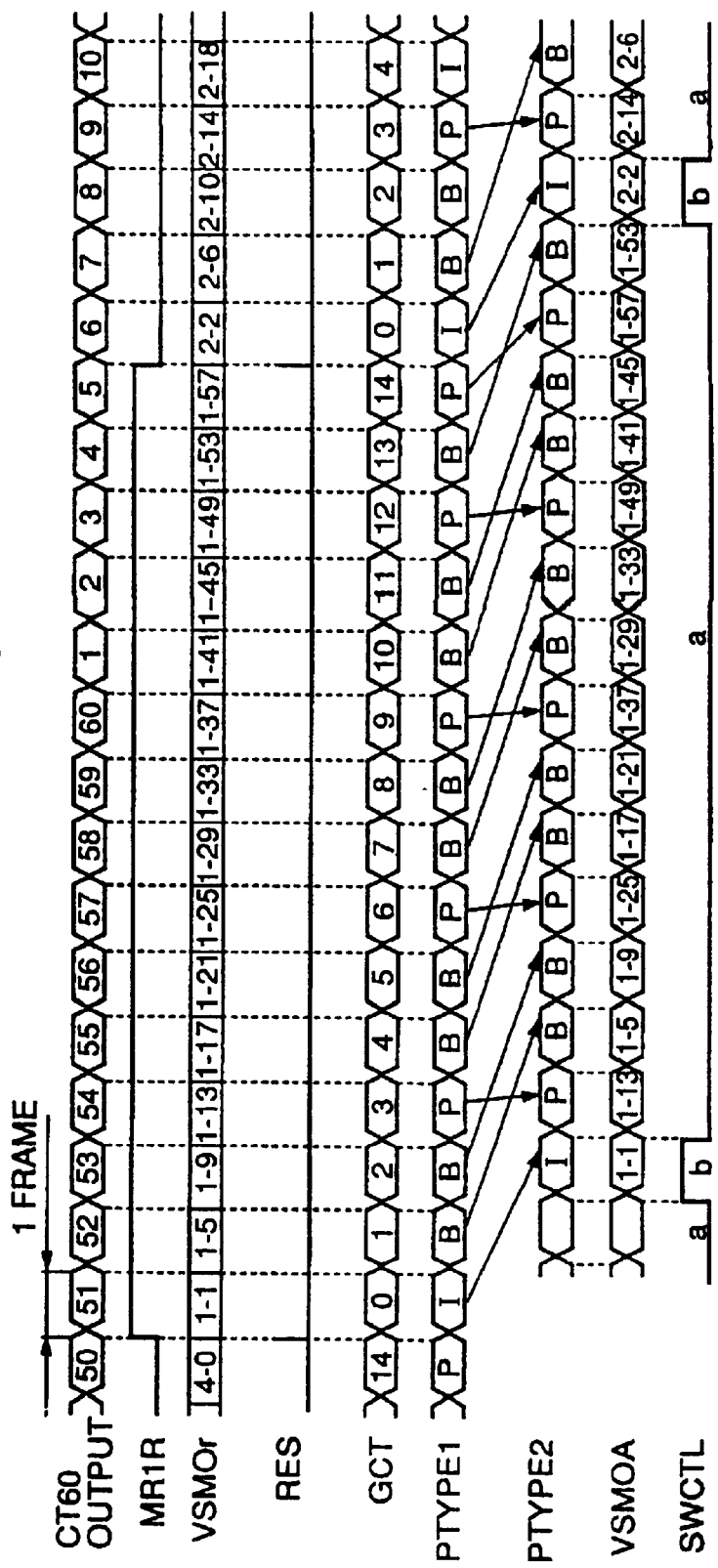
FIG. 10 is a timing diagram showing the operation of the MPEG encoding circuit 11 shown in FIG. 9.

FIG. 10 is a timing diagram showing the operation of the MPEG encoding circuit shown in FIG. 9.

In this figure, the counter value CT60 of the base-60 counter circuit 61, the Read Enable signal MR1R of the memory (1R) 6, the video data VSMOr, and the RES signal are included to show the correspondence between this operation and the operation of the memory control circuit for recording mode 13 shown in FIG. 7.

In FIG. 10, GCT is the count value of the counter contained in the picture type determination circuit 84, PTYPE1 is the picture type of the video data VSMOr, and PTYPE2 is the picture type of the video signal VSMOA output from the picture reordering circuit 71 shown in FIG. 2.

Until reset by the RES signal, GCT is incremented each time one frame is processed.

Because the RES signal goes high every 15 frames as shown in FIG. 10, the count value of GCT is reset every 15 frames.

As PTYPE1 in FIG. 10 shows, the picture type determination circuit 84 sends the control signal to each part so that the video data VSMOr (one frame of video data) at GCT=0 is coded as I picture data.

Similarly, the circuit sends the control signal so that the video data VSMOr at GCT=1 and at GCT=2 is B picture data and so that the video data VSMOr at GCT=3 is P picture data.

The picture reordering circuit 71 reorders picture data such that B-picture data follows I- and P-picture data which will be used for prediction, as shown in FIG. 10, in order to allow bi-directionally predictive encoding to be performed.

As a result, the picture reordering circuit 71 processes the frames of the output video signal VSMOA in the sequence shown by VSMOA in FIG. 10. When encoding frames "1-1" and "2-2" which will be used as I-picture data, the control signal SWCTL from the picture type determination circuit 84 is set high to cause the switching circuits 73 and 83 to select side B. This prevents inter-frame predictive encoding from being executed when processing these images.

The MPEG encoding circuit 11 described above constitutes the GOP only with the video data corresponding to the video signals from one camera (for example, VSMOr "1-1"–"1-57" shown in FIG. 10).

The video data of some other GOP is the video data corresponding to the video signals from some other camera, and inter-frame prediction therefore has no effect. That is, the GOP is closed to prevent inter-frame prediction encoding from being performed on other GOPs.

Although the GOP is composed of 15 frames and P-picture data appears at an interval of 3 frames in this embodiment, it should be understood that these are sample settings. Other settings may be used provided that the maximum count of the counter 61 shown in FIG. 6 is four times (corresponding to the number of cameras) as large as the number of frames of the GOP.

Next, the recording/playback module 14 will be described.

The recording/playback module 14 may use a VTR conforming to D-VHS (Digital-Video Home System) which records and plays back digital signals based on the VHS (Video Home System) standard. Or, the medium may use an optical disk or a hard disk. The user may select one of them which is best in terms of such factors as recording times, costs, and reliability.

Ideally, a medium in which the recording bit stream BSr equals the playback bit stream BSp should be selected.

Next, the MPEG decoding circuit 15 will be described.

Figure 11:
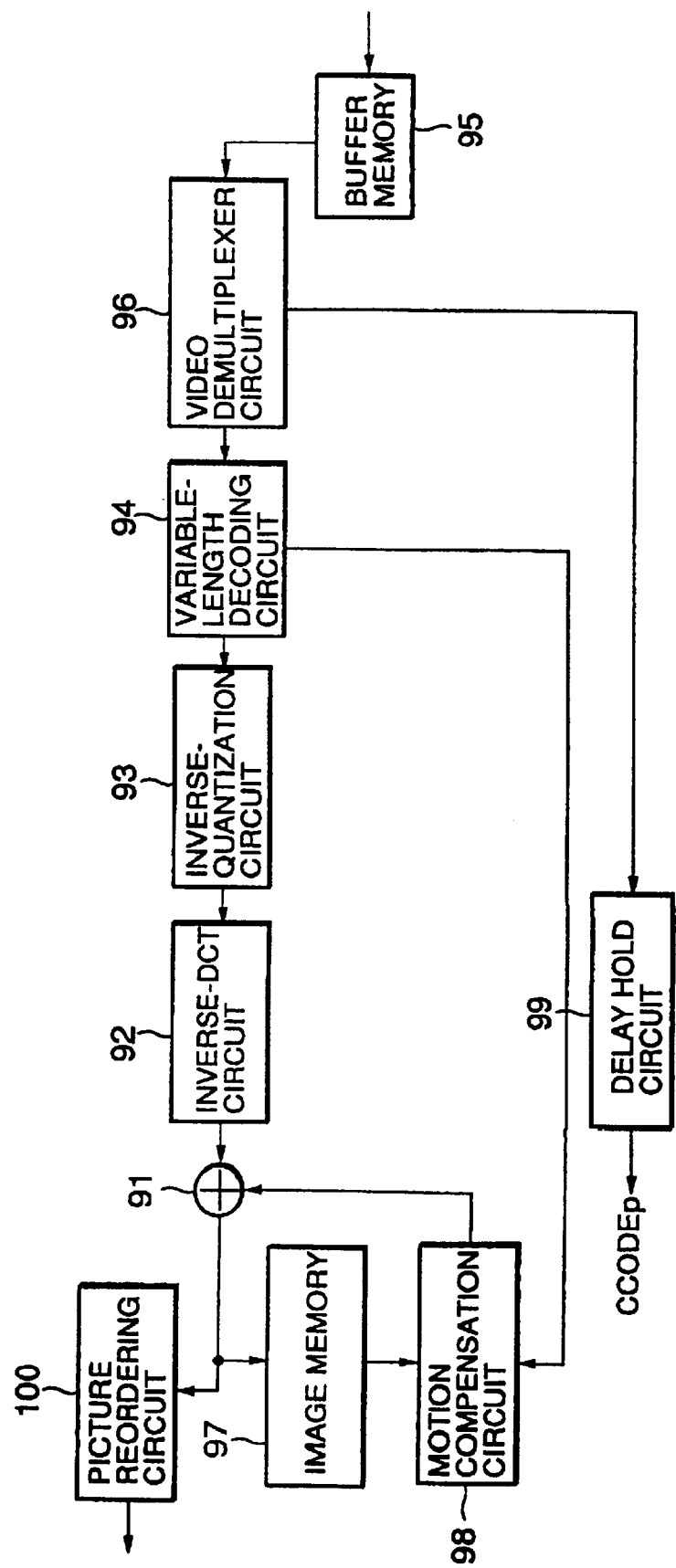
FIG. 11 is a diagram showing the outline of the MPEG decoding circuit 15 shown in FIG. 1.

FIG. 11 is a diagram showing the outline of the MPEG decoding circuit 15 shown in FIG. 1.

In this figure, number 91 refers to an addition circuit, number 92 refers to as inverse-DCT circuit, number 93 refers to an inverse-quantization circuit, number 94 refers to a variable-length decoding circuit, number 95 refers to a buffer memory, number 96 refers to a video demultiplexer circuit, number 97 refers to an image memory, number 98 refers to a motion compensation circuit, number 99 refers to a delay hold circuit, and number 100 refers to a picture reordering circuit.

The MPEG bit stream BSp played back by the recording/playback module 14 is stored temporarily in the buffer memory 95 and then output to the video demultiplexer circuit 96.

The video demultiplexer circuit 96 separates video coded data and various codes from the bit stream BSp. Then, the circuit outputs the video coded data to the variable-length decoding circuit 94 and, at the same time, generates the necessary control signals, based on the codes, for transmission to various parts.

The video demultiplexer circuit 96 also detects the camera code inserted as the user data of the GOP layer and outputs the detected camera code to the delay hold circuit 99.

The delay hold circuit 99 delays the camera code by the time needed to decode the video signal to synchronize it with the output from the picture reordering circuit 100. The circuit also holds the value for one GOP period (for the period of 15 frames in this embodiment) and outputs it to the memory control circuit for playback mode 21.

Basically, the reverse processing of the encoding processing of the MPEG encoding circuit 11 is performed for the video coded data de-multiplexed by the video demultiplexer circuit 96. Because this processing is the same as the normal MPEG decoding, the following explains only the overview.

That is, the variable-length decoding circuit 94 decodes the macro block encoding information and separates the encoding mode, motion vector, quantization data, and quantization DCT coefficient.

The decoded 8×8 quantization DCT coefficient is decoded by the inverse-quantization circuit 93 into the DCT coefficient and, after that, converted to video data by the inverse-DCT circuit 92.

In the intra-encoding mode, the DCT coefficient is output as it is.

In the motion compensation predictive mode, block data for which motion compensation prediction is made is added by the addition circuit 91.

I-picture data and P-picture data, which will be used in later decoding as reference screens, are written into the image memory 97.

Finally, the picture reordering circuit 100 arranges the frames in the reverse order to which the frames were initially ordered by the MPEG encoding circuit 11. As a result, the video data VSPIp composed of the frames in the same order as those of the video data VSMOr entered into the MPEG encoding circuit 11 is generated.

Next, the memory (1P) 16 to the memory (4P) 19 will be described.

Like the memory (1R) 6 to the memory (4R) 9, the memory (1P) 16 to the memory (4P) 19 are composed of FIFO memories. They are controlled by the Write Reset signal, Write Enable signal, Read Reset signal, and Read Enable signal generated by the memory control circuit for playback mode 21.

This causes MPEG-decoded video data composed of re-sequenced frames to be written into the memory (1P) 16 to the memory (4P) 19.

This reordering processing is performed by reversing the order in which video data VSMIr is read from, or written into, the memory (1R) 6 to the memory (4R) 9.

Next, the memory control circuit for playback mode 21 will be described.

Figure 12:
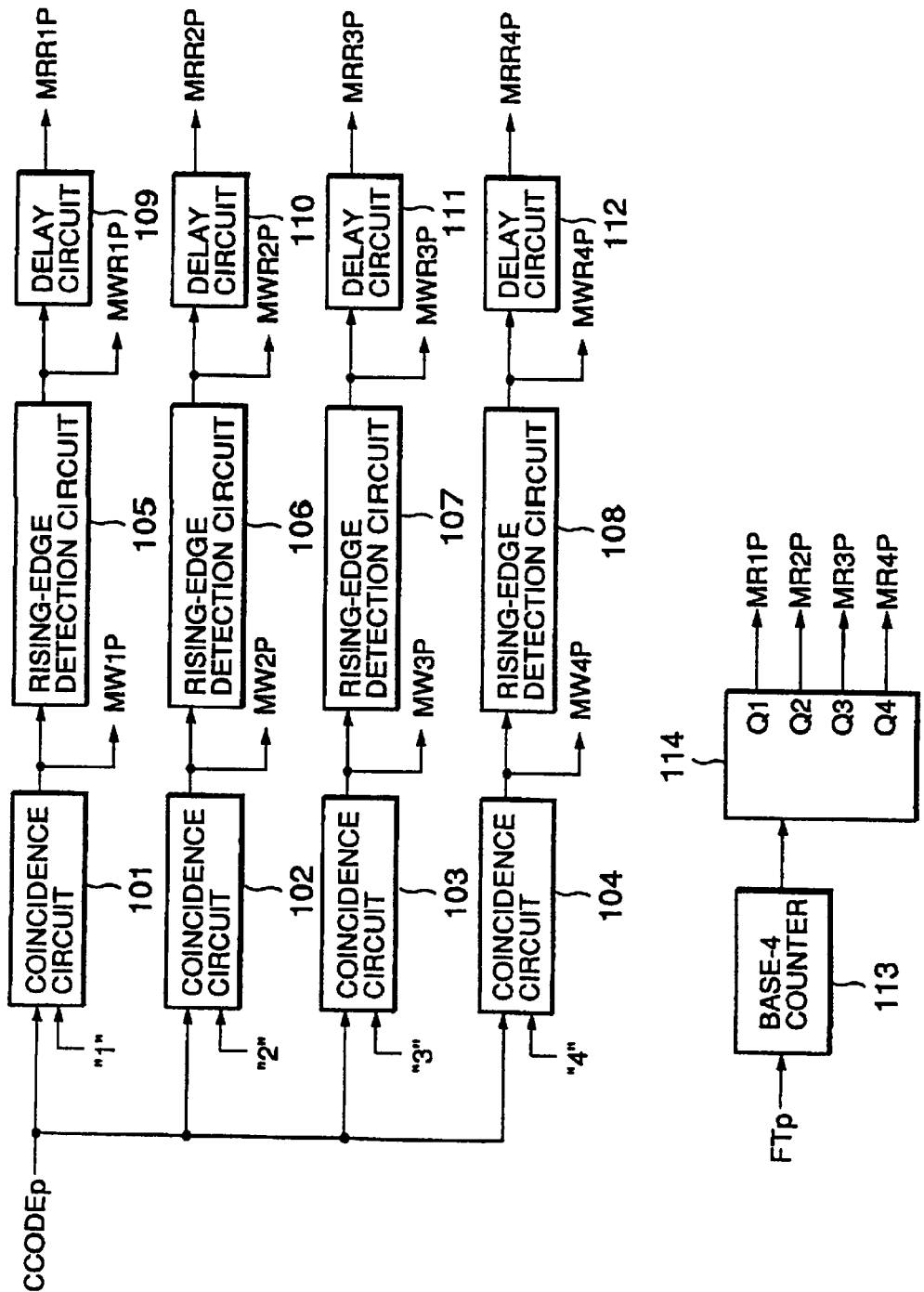
FIG. 12 is a diagram showing the outline of the memory control circuit for playback mode 21 shown in FIG. 1.

FIG. 12 is a diagram showing the outline of the memory control circuit for playback mode 21 shown in FIG. 1.

In this figure, numbers 101 to number 104 refer to coincidence circuits, number 105 to number 108 refer to rising-edge detection circuits, number 109 to number 112 refer to delay circuits, number 113 refers to a base-4 counter, and number 114 refers to a decoder circuit.

The coincidence circuit 101 sets the output high when the camera code CCODEp from the delay hold circuit 99 shown in FIG. 11 is "1". The output is sent to the memory (1P) 16 as the Write Enable signal (MW1P).

The coincidence circuit 102 sets the output high when the camera code CCODEp from the delay hold circuit 99 is "2". The output is sent to the memory (2P) 17 as the Write Enable signal MW2P.

The coincidence circuit 103 sets the output high when the camera code CCODEp from the delay hold circuit 99 is "3". The output is sent to the memory (3P) 18 as the Write Enable signal MW3P.

The coincidence circuit 104 sets the output high when the camera code CCODEp from the delay hold circuit 99 is "4". The output is sent to the memory (4P) 19 as the Write Enable signal MW4P.

The rising-edge detection circuit 105 sets the output high only for one clock period when the Write Enable signal MW1P goes high. The output is sent to the memory (1P) 16 as the Write Reset signal MWR1P.

The rising-edge detection circuit 106 sets the output high only for one clock period when the Write Enable signal MW2P goes high. The output is sent to the memory (2P) 17 as the Write Reset signal MWR2P.

The rising-edge detection circuit 107 sets the output high only for one clock period when the Write Enable signal MW3P goes high. The output is sent to the memory (3P) 18 as the Write Reset signal MWR3P.

The rising-edge detection circuit 108 sets the output high only for one clock period when the Write Enable signal MW4P goes high. The output is sent to the memory (4P) 19 as the Write Reset signal MWR4P.

The delay circuit 109 delays the Write Reset signal MWR1P by one frame. The output is sent to the memory (1P) 16 as the Read Reset signal MRR1P.

The delay circuit 110 delays the Write Reset signal MWR2P by one frame. The output is sent to the memory (2P) 17 as the Read Reset signal MRR2P.

The delay circuit 111 delays the Write Reset signal MWR3P by one frame. The output is sent to the memory (3P) 18 as the Read Reset signal MRR3P.

The delay circuit 112 delays the Write Reset signal MWR4P by one frame. The output is sent to the memory (4P) 19 as the Read Reset signal MRR4P.

The base-4 counter 113 increments the count value according to the frame reference timing FTp of the video data VSMIp.

The decoder circuit 114 sets the output terminals Q0, Q1, Q2, and Q3 high when the count value of the base-4 counter 113 is 0, 1, 2, and 3, respectively. The high-level signals from the output terminals Q0 to Q3 are used as the Read Enable signals MR1P–MR4P of the memory (1P) 16 to memory (4P) 19.

The following explains how the memory control circuit for playback mode 21 writes and reads video data VSMIp to and from the memory (1P) 16 to memory (4P) 19.

Figure 13:
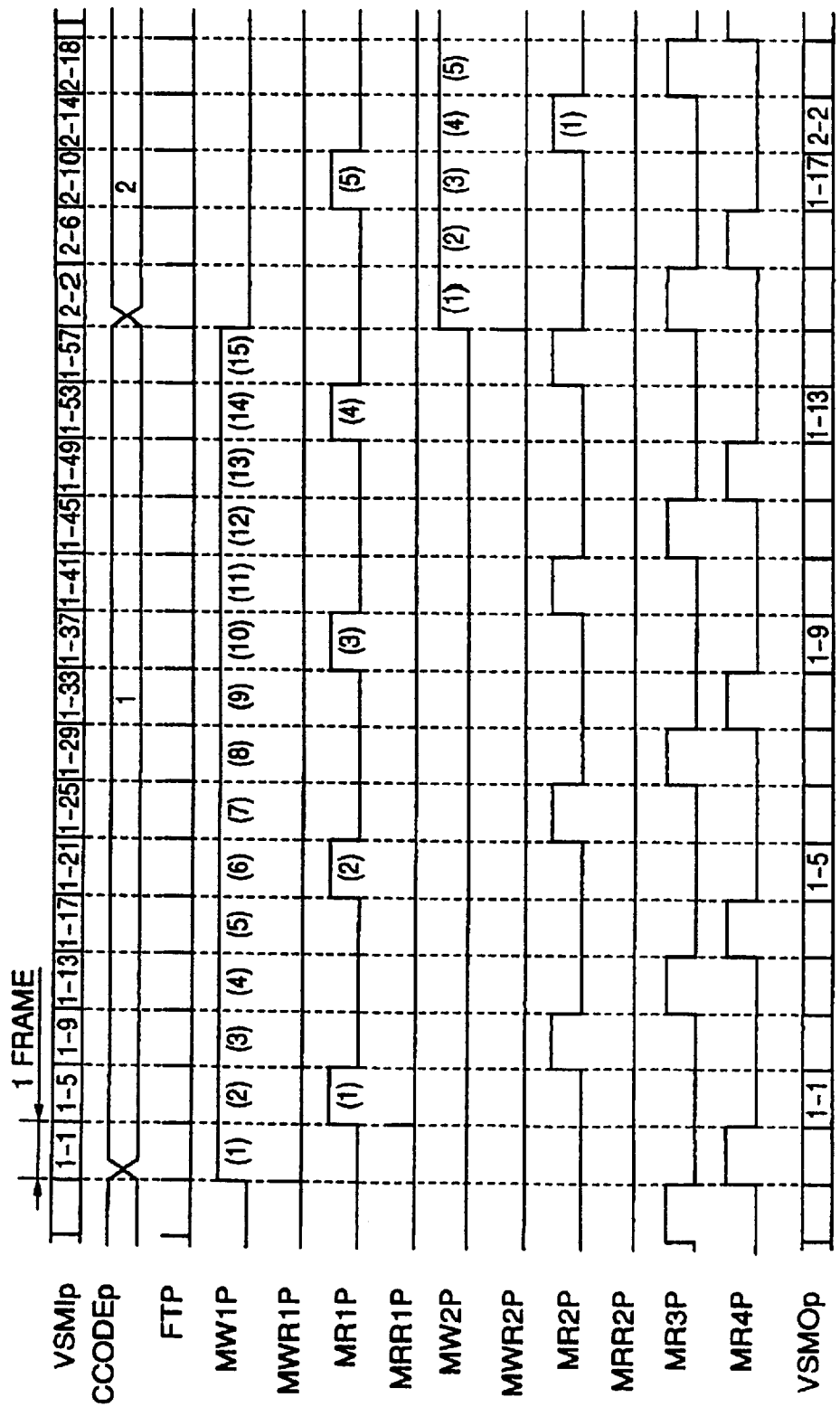
FIG. 13 is a timing diagram showing the operation of the memory control circuit for playback mode 21 shown in FIG. 12.

FIG. 13 is a timing diagram showing the timing in which the memory control circuit for playback mode 21 writes the video data VSMIp into memory (1P) 16 to the memory (4P) 19.

The video data VSMIP entered into the memory (1P) 16–the memory (4P) 19 is composed of video data, corresponding to the video signals VS1–VS4 received by the video input terminals 1–4, which is switched every 15 frames. The camera code CCODEp is a number corresponding to one of video signals VS1–VS4.

First, the write operation and the read operation on the memory (1P) 16 will be described.

The Write Enable signal MW1P remains high for 15 frames while the value of the camera code CCODEp is "1".

The Write Reset signal MWR1P goes high on the rising edge of the Write Enable signal MW1P. Therefore, the video data VSMIp corresponding to 15 frames of the video signal VS1, from "1-1" to "1-57", are continuously written into the memory (1R) 6.

A number within parentheses that is shown with the Write Enable signal MW1P in FIG. 13 indicates the memory area into which video data is written.

The Read Reset signal MRR1P goes high one frame after the Write Reset signal MWR1P.

The Read Enable signal MR1P, which remains high for one frame every four frames, causes the video data VSMIp, previously written into the memory (1P) 16 during the above write operation, to be read intermittently every four frames.

A number within parentheses that is shown with the Read Enable signal MR1P in FIG. 13 indicates the memory area from which video data is read.

As a result, for the first scores of frames, video data corresponding only to the video signal VS1, which was received by the video input terminals 1, is output from the memory (1P) 16–the memory (4P) 19 every 4 frames as shown in FIG. 13.

Next, the write operation and the read operation on the memory (2P) 17 will be described.

The Write Reset signal MWR2P and the Write Enable signal MW2P are generated 15 frames after the Write Reset signal MWR1P and the Write Enable signal MW1P that are generated for the memory (1P) 16.

Thus, fifteen frames after the video data is written into the memory (1P) 16, the video data VSMIp corresponding to the 15 frames of the video signal VS2, "2-2" to "2-58", is continuously written into the memory (2P) 17.

At the same time, the Read Reset signal MRR2P goes high one frame after the Write Reset signal MWR2P goes high and then, while the Read Enable signal MR2P is high, the video data corresponding to the video signal VS2 received by the input terminal 2, which were written during the above write operation, is read every 4 frames.

For the read/write operation on the memory (3P) 18 and the memory (4P) 19, only the Read Enable signals MR3P and MR4P are shown In FIG. 13. For these memories, the same operation as for the memory (1P) 16 and the memory (2P) 17 is performed about 15 frames after the above operation.

By performing the operation described above, the memory control circuit for playback mode 21 converts the video data VSMIp corresponding to the video signals VS1–VS4, time-divided on a 15-frame basis, to the video data VSMOp composed of the frames in a similar order as that of the frames of the video data VSMIr from the video decoder circuit 26.

The video data VSMOp shown in FIG. 13 with no video data number is invalid data that was read when the Read Enable signal (MR2P and so on) went high before the first data was written into the memory. The camera code addition circuit 23 does not add camera codes to this invalid data, and the display control circuit 24 does not display it on the monitor.

It should be noted that the order of the frames of the video data VSMOp decoded by the memory control circuit for playback mode 21 may sometimes not match the order of the frames of the video data VSMIr sent from the video decoder circuit 26. However, the difference is not significant. To exactly match the order of the frames with that of the frames of the video data VSMIr generated by the video decoder circuit 26, the output timing of the video data corresponding to the video signals received by the video input terminals VS1–VS4 should be adjusted, with the video data VSMOp stored in memory.

Next, the display control circuit 24 will be described.

Figure 14:
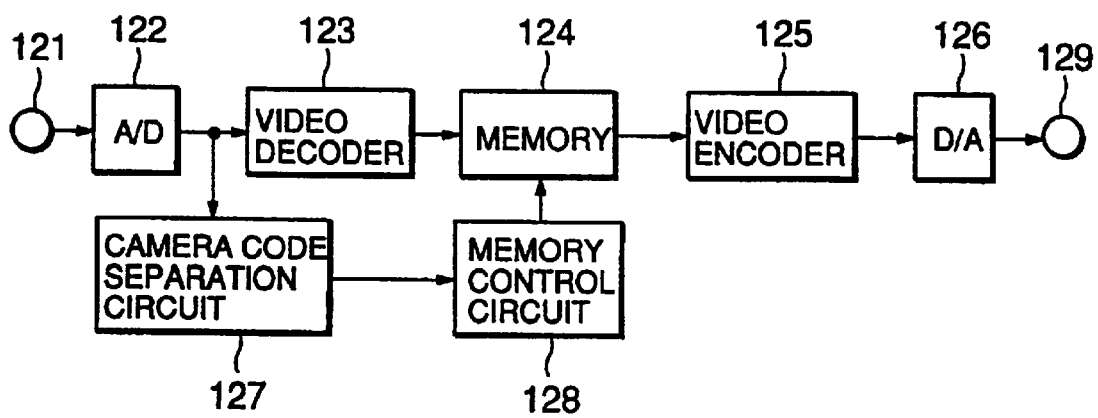
FIG. 14 is a diagram showing the outline of the display control circuit 24 shown in FIG. 1.

FIG. 14 is a diagram showing the outline of the display control circuit 24 shown in FIG. 1.

In this figure, number 121 refers to a video signal input terminal, number 122 refers to an A/D converter, number 123 refers to a video decoder, number 124 refers to a memory, number 125 refers to a video encoder, number 126 refers to a D/A converter, number 127 refers to a camera code separation circuit, number 128 refers to a memory control circuit, and number 129 refers to a video signal output terminal.

The video data VSMOp read from the memory (1P) 16-the memory (4P) 19 is converted to composite video signals by the video encoder circuit 27 for input to the video signal input terminal 121.

The A/D converter 122 digitizes the composite video signals received by the video signal input terminal 121.

The video decoder 123 divides the composite signals digitized by the A/D converter 122 into two: luminance signal data and color difference signal data.

The camera code separation circuit 127 separates the camera code from the vertical sync part of the composite video signal for transmission to the memory control circuit 128.

The memory control circuit 128 checks the received camera code to generate the control signal which causes only the luminance signal data and the color difference signal data included in the video signal, identified by the specified camera code, to be written into the memory 124.

The circuit also generates the control signal which causes data to be read continuously.

The video encoder 125 converts the luminance signal data and the color difference signal data, read from the memory 124, to digital composite video signal.

The D/A converter 129 converts the digital composite video signal converted by the video encoder 125 to an analog composite video signal.

The signal is then sent from the video signal output terminal 129 to the monitor not shown in the figure.

By performing the above operation, only the video desired by the operator may be monitored. Or, by sequentially writing video data items from four cameras, each having information amount that is reduced in horizontal and vertical direction, into four areas of the memory 124, video from four cameras may be monitored at a time. The detailed description of the display control circuit 24 is omitted here, because the operation is the same as the playback operation of the conventional frame switcher.

In the first embodiment described above, the synchronization switching circuit 5 generates the mixed video signal VO by switching, frame by frame, the video signals VS1–VS4 from four video cameras. The memory control circuit for recording mode 13 also stores this mixed video signal as a plurality of frames (15 frames in this embodiment) into the memory (1R) 6–memory (4R) 9, each corresponding to the video signals VS1–VS4.

Then, the video signal composed of a plurality of frames and stored in the memory (1R) 6–the memory (4R) 9 is sequentially read respectively into the MPEG encoding circuit 11 where the signal is encoded using MPEG.

That is, the video signals VS1–VS4 are written into the memory (1P) 16–the memory (4P) 19, each at an interval of 4 frames. The video data written into the memories is read continuously, 15 frames at a time, to form one image group (GOP).

The image data in this image group is compressed with the MPEG algorithm using inter-frame prediction.

Thus, because the inter-frame correlation of the video signal sent to the MPEG encoding circuit 11 is high, video may be compressed at a higher level with less degradation.

In the first embodiment, the video signals from four video cameras, VS1–VS4, are sequentially switched, frame by frame, to generate mixed video signal data. This data is encoded efficiently with one MPEG encoding circuit 11. Thus, it is possible to provide a low-cost video data recording/playback system containing a low-cost video data compression encoding system or a compression encoding circuit.

In addition, in the first embodiment, the synchronization switching circuit 5 and the display control circuit 24 may be those used in the conventional frame switcher for a time-lapse VTR. The synchronization switching circuit 5 eliminates the need for the four cameras to be synchronized.

In the first embodiment, one GOP is composed of 15 frames (n=15). This invention is not limited to this number. Nor is the number of cameras limited to four (m=4). For the values of m and n other than those given above, a (m×n)-base counter is used for the base-60 counter 61 shown in FIG. 6 and an appropriate value is used as the decode value of the decoder circuit 62.

Although the mixed video signal generated by the synchronization switching circuit 5 is compressed in the first embodiment, the synchronization switching circuit 5 is not always needed.

For example, each of the video signals from the video input terminals 1–4 may be decoded by a video decoder and, then a specified number of frames may be sequentially obtained from each of the video signals and stored into the corresponding memory, 6–9. Storing (that is, writing) one frame of video data into the memories 6–9 every 4 frames results in the same video data as that of the first embodiment being stored in memories 6–9. Executing the same operation for the read control step on the memories 6–9 and for the subsequent steps gives the user the same effect.

Next, a second embodiment will be described.

Figure 15:
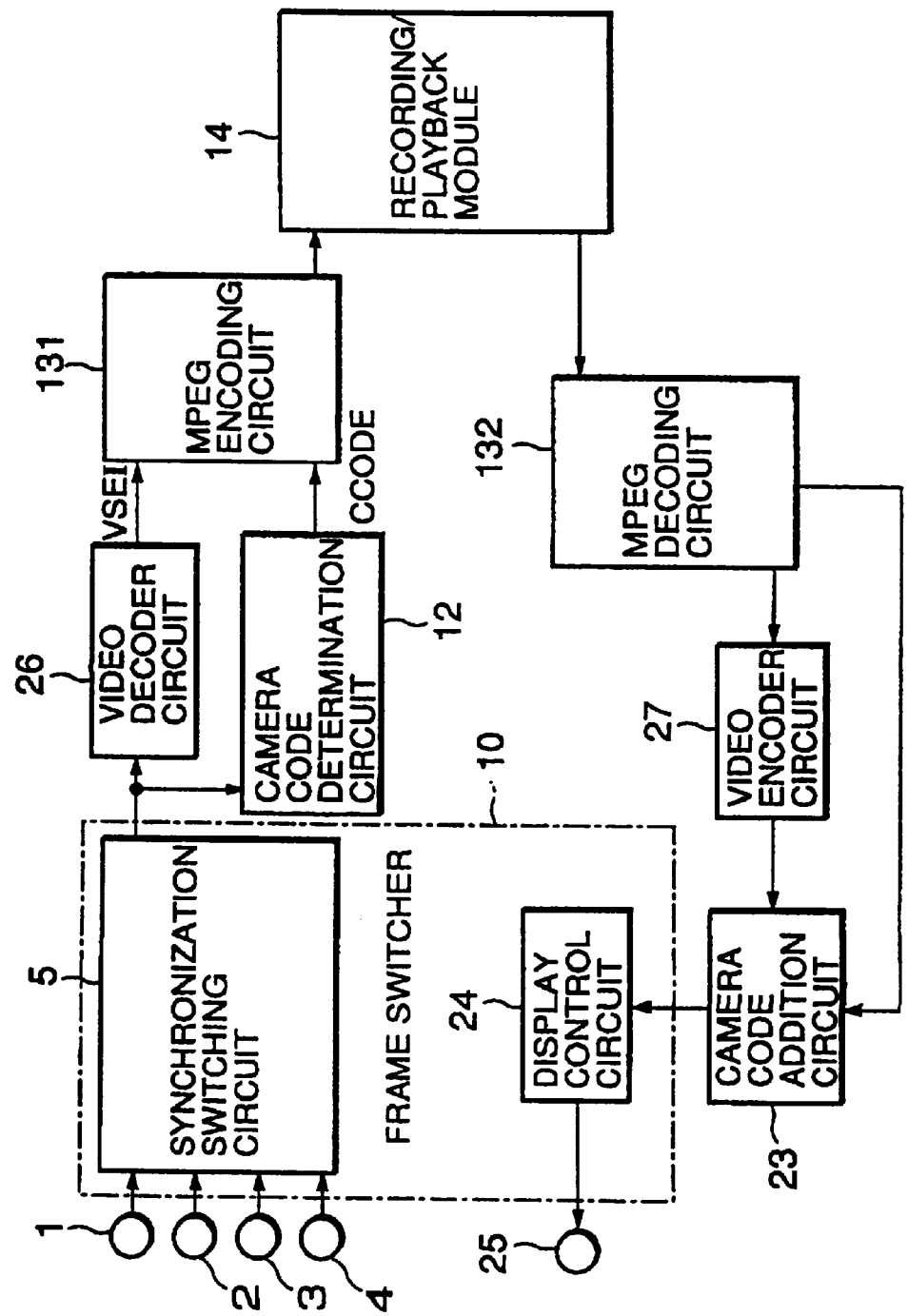
FIG. 15 is a block diagram showing the outline of a video data recording/playback system of a second embodiment of this invention.

FIG. 15 is a diagram showing the outline of a video data recording/playback system of the second embodiment.

The video data recording/playback system shown in FIG. 15 differs from the system of the first embodiment in that the memory (1R) 6–memory (4R) 9 and the memory (1P) 16–memory (4P) 19 are not provided and that an MPEG encoding circuit 131 and an MPEG decoding circuit 132 are provided instead of the MPEG encoding circuit 11 and the MPEG decoding circuit 15.

The rest of the configuration is the same as that of the video data recording/playback system shown in FIG. 1. The detailed description of a functionally-equivalent component is omitted here, with the same number assigned to the corresponding component.

First, the MPEG encoding circuit 131 will be described.

Figure 16:
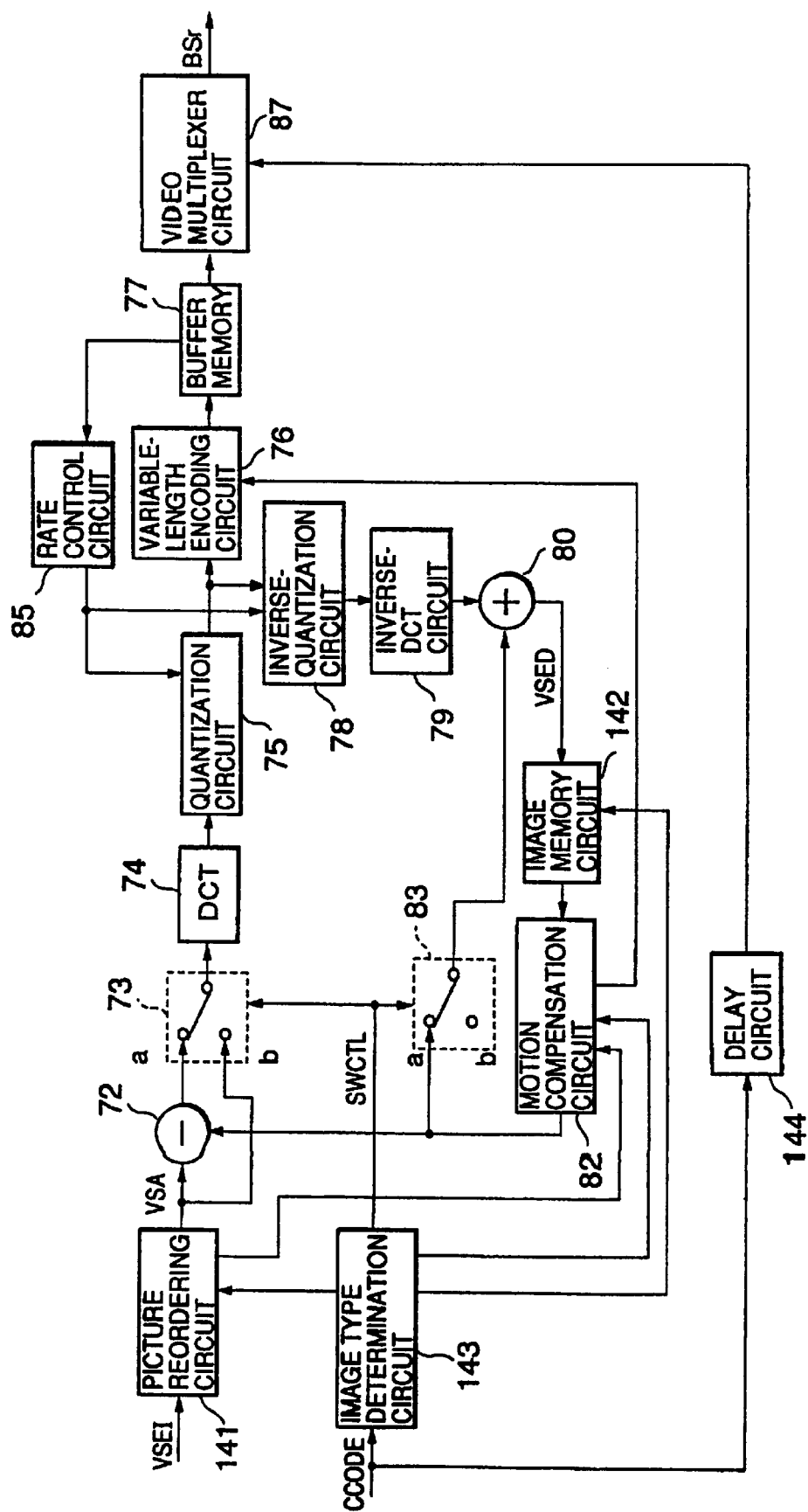
FIG. 16 is a diagram showing the outline of the MPEG encoding circuit 131 shown in FIG. 15.

FIG. 16 is a diagram showing the outline of the MPEG encoding circuit 131.

In this figure, number 143 refers to a picture type determination circuit which switches the picture type every 4 frames, number 141 refers to a picture reordering circuit which reorders frames, 4 frames at a time, according to the frame type determined by the picture type determination circuit 143, number 142 refers to an image memory circuit which stores video data, 4 frames at a time, according to the picture type determined by the picture type determination circuit 143, and number 144 refers to a delay circuit.

The rest of the configuration is the same as that of the MPEG encoding circuit 11 shown in FIG. 9. The detailed description of components functionally equivalent to these shown in FIG. 9 will be omitted here, with the same number being assigned to the corresponding component.

First, the picture reordering circuit 141 shown in FIG. 16 is described.

Figure 17:
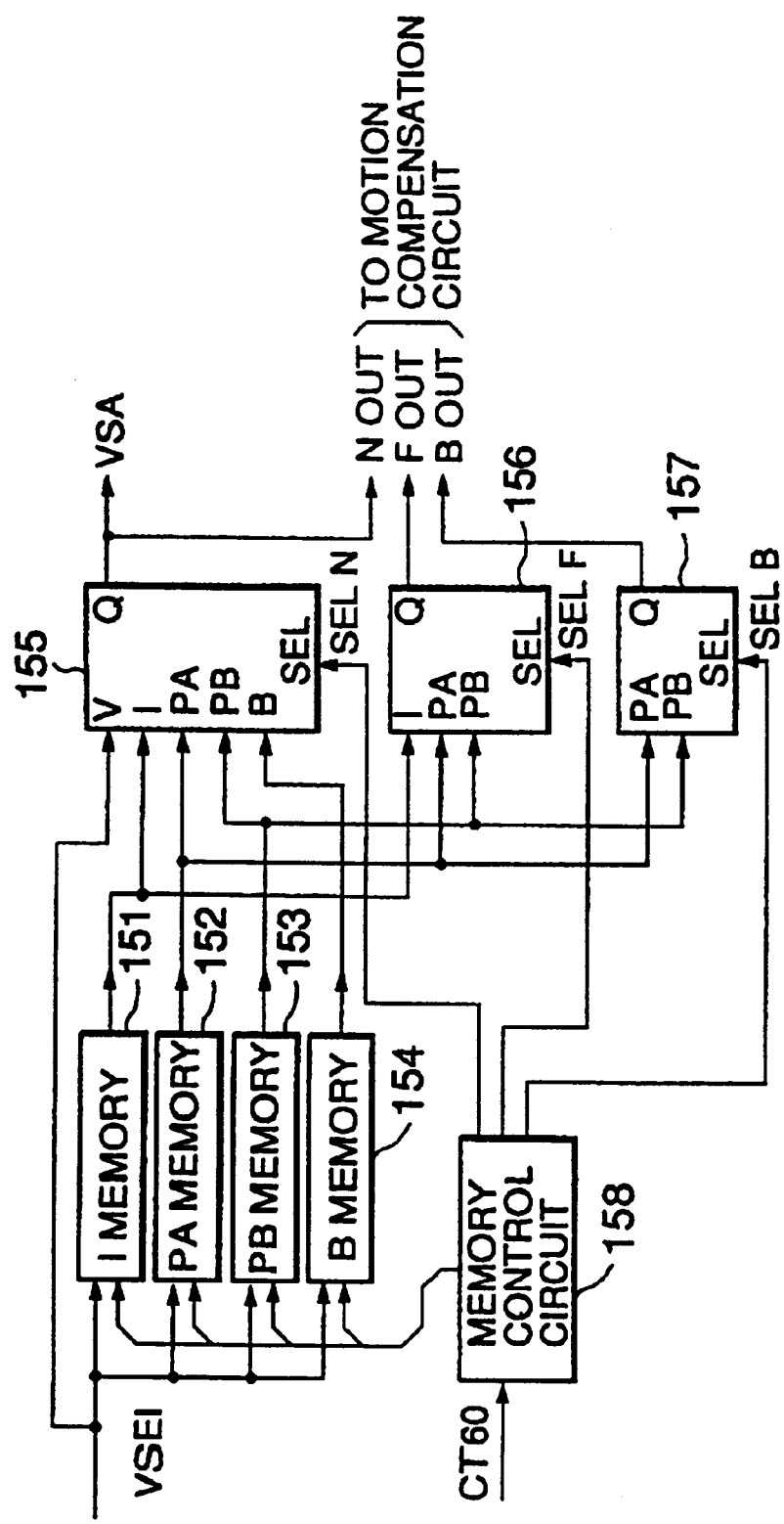
FIG. 17 is a diagram showing the outline of the picture reordering circuit 141 shown in FIG. 16.

FIG. 17 is a diagram showing the outline of the picture reordering circuit 141 shown in FIG. 16.

In this figure, number 151 to 154 refer to memories, numbers 155 to 157 refer to selection circuits, and number 158 refers to a memory control circuit. VSEI is video data generated by the video decoder circuit 26.

Figure 18:
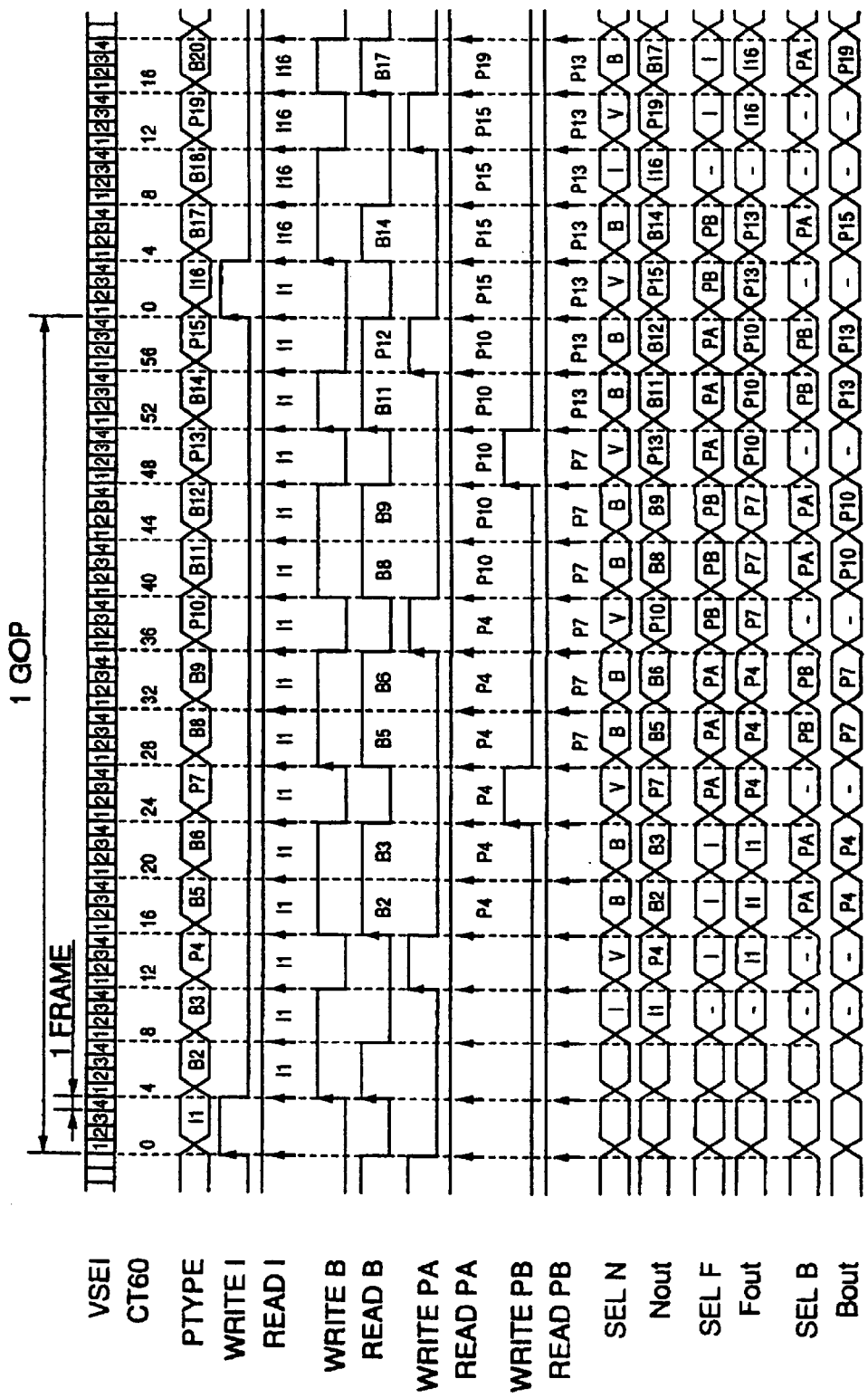
FIG. 18 is a timing diagram showing the operation of the picture reordering circuit 141 shown in FIG. 17.

FIG. 18 is a timing diagram showing the operation of the picture reordering circuit 141 shown in FIG. 17.

A number in the video data VSEI is a camera code CCODE, that is, one of the numbers of video input terminals 1–4.

CT60, a base-60 counter contained in the picture type determination circuit 143, is incremented by 1 each time a frame is processed. The counter is reset when the camera code CCODE entered into the picture type determination circuit 143 is set to 1.

PTYPE is a picture type determined by the picture type determination circuit 143. The picture type determination circuit 143 determines the picture type PTYPE, every 4 frames, according to the value of CT60 and sends the determined type to each part.

For example, when CT60 contains a value between "0" and "3", the picture type is I picture. The first I picture data is indicated by "I1" in the figure. The picture type is determined in the same manner every 4 frames, such as B picture "B2", B picture "B3", or P picture "P4".

The memory control circuit 158 shown in FIG. 17 generates control signals for the memories 151–154 based on the value of CT60.

More specifically, the circuit generates "write I" which is the Write Enable signal for the I memory 151 as shown in FIG. 18. Video data is written into the I memory 151 while "write I" is high.

In the figure, the arrow of "write I" indicates the Write Reset signal generated by memory control circuit 158 for the I memory 151. The write address is reset in the timing shown by the arrow.

As shown in FIG. 18, the I memory 151 is reset when the value of CT60 becomes "0" and data is written there while CT60 has a value raging from "0" to "3". Therefore, four frames of video data specified as "I picture" is written every 60 frames.

At the same time, the memory control circuit 158 generates "read I" which is the Read Enable signal for the I memory 151. Video data is read from the I memory 151 while "read I" is high.

In the figure, the arrow of "read I" indicates the Read Reset signal for the I memory 151. The read address is reset in the timing shown by the arrow.

Therefore, as shown in FIG. 18, data is read from the I memory 151 while resetting the read address every 4 frames.

In addition, the memory control circuit 158 generates, in the timing shown in FIG. 18, "write B" and "read B" which are the control signals for the B memory 154, "write PA" and "read PA" which are the control signals for the PA memory 152, and "write PB" and "read PB" which are the control signals for the PB memory 153.

As a result, only video data specified as "B picture" is written into the B memory 154, and only video data specified as "P picture" is written into the PA memory 152 and the PB memory 153.

When the Write Reset signal and the Read Reset signal are turned on at the same time for the memories 151–154, old data is read. The content of video data that is read is shown by the characters for "read I" in FIG. 18.

Therefore, data in the I memory 151 is updated when the value of CT60 is changed to 4 and, for 60 frames, the same video data is read repeatedly every 4 frames.

In addition to the above memory control signals, the memory control circuit 158 generates the selection signals for the selection circuits 155–157.

More specifically, the circuit generates the selection signal SEL N used by the selection circuit 155 to select video data received by the input terminal.

In FIG. 17, the characters such as "I", "V", or "B" indicate that video data was selected by the input terminal indicated by the character.

"Nout" indicates video data output from the Q terminal of the selection circuit 155. As shown in FIG. 18, video data is output according to the order of picture type processing (I, P, B, B, P, B, . . . ) during normal MPEG encoding.

Note that picture types are changed every 4 frames, not every frame.

Nout is supplied to the subtracter 72 and the switching circuit 73 shown in FIG. 16 as the video data VSA to be coded and, at the same time, to the motion compensation circuit 82 as the current motion vector detection signal.

The memory control circuit 158 also generates the selection signal SEL F used by the selection circuit 156 to select video data entered at the input terminal, and selection signal SEL B used by the selection circuit 157 to select video data entered at the input terminal, in the timing shown in FIG. 18.

"Fout" indicates video data output from the Q terminal of the selection circuit 156. "Fout" is supplied to the motion compensation circuit 82 as the forward motion vector detection signal. "-" in the figure indicates video data not used for motion detection. For example "0" is output as "-".

"Bout" indicates video data output from the Q terminal of the selection circuit 157. "Bout" is supplied to the motion compensation circuit 82 as the backward motion vector detection signal.

By performing the operation described above, the picture reordering circuit 141 treats four frames of video data, entered sequentially from the video input terminals 1–4, as one group of data. The camera numbers of "Nout", "Fout", and "Bout" data are always synchronized.

This allows video data entered through the same video data input terminal to be processed between frames when the motion compensation circuit 82 detects motion vectors, thus enabling motion vectors to be detected one after another. In other words, the motion compensation circuit 82 is shared by video data from four cameras in the time dividing manner.

Next, the image memory circuit 142 shown in FIG. 16 will be described.

Figure 19:
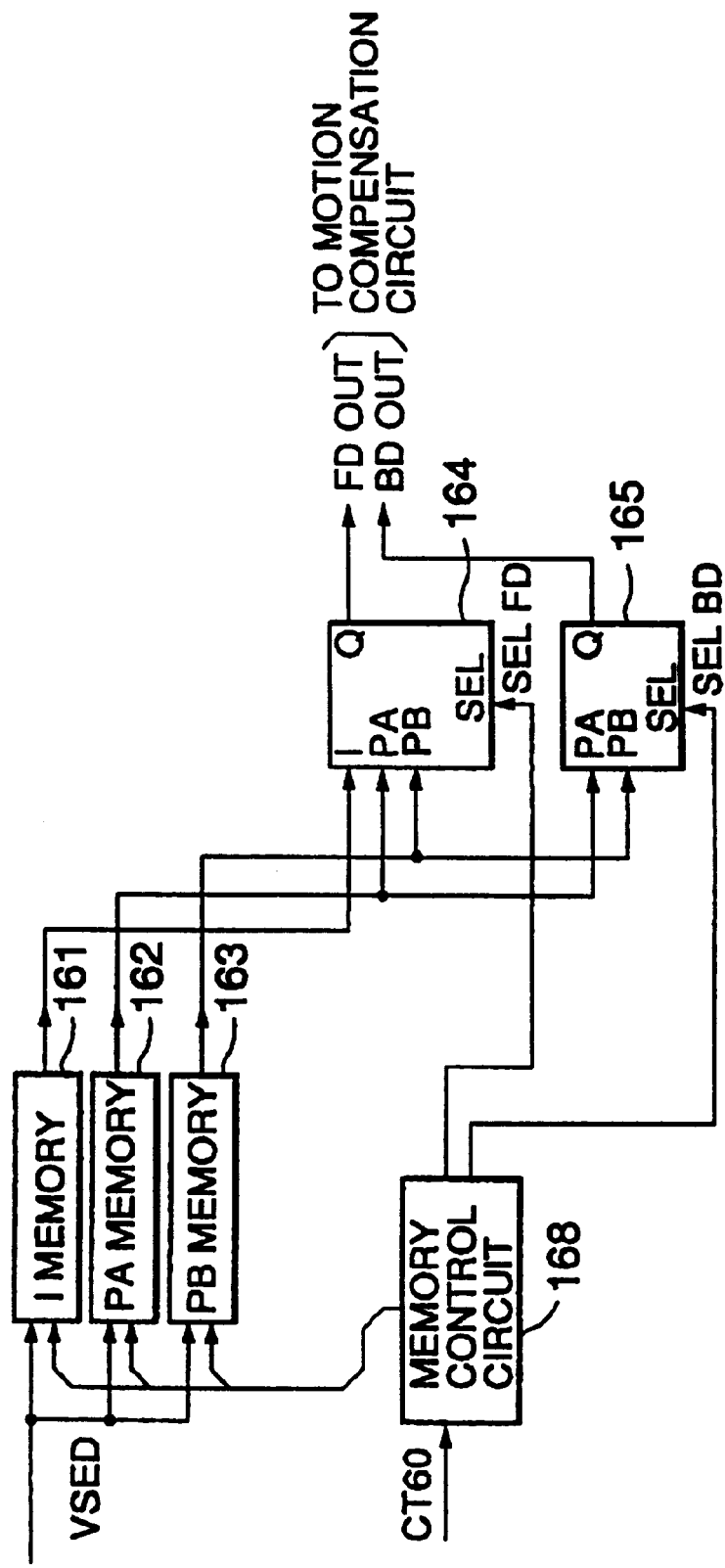
FIG. 19 is a diagram showing the outline of the image memory circuit 142 shown in FIG. 15.

FIG. 19 is a diagram showing the outline of the image memory circuit 142 shown in FIG. 16.

In this figure, number 161 refers to an I memory in which I picture data is stored, number 162 refers to a PA memory, number 163 refers to a PB memory in which P picture data is stored, numbers 164 and 165 refer to selection circuits, and number 166 refers to a memory control circuit.

The memories 161–163 are FIFO memories similar to the memory (1R) 6 shown in FIG. 1. These memories are controlled by the Write Reset signal, the Write Enable signal, the Read Reset signal, and the Read Enable signal generated by the memory control circuit 166.

The selection circuit 164 selects one of video data entered at the I, PA, and PB input terminals according to the selection signal SEL FD entered at the SEL terminal, and outputs the video data from the Q terminal.

The selection circuit 165 selects one of video data entered at the PA and PB input terminals according to the selection signal SEL BD entered at the SEL terminal, and outputs the video data from the Q terminal.

Figure 20:
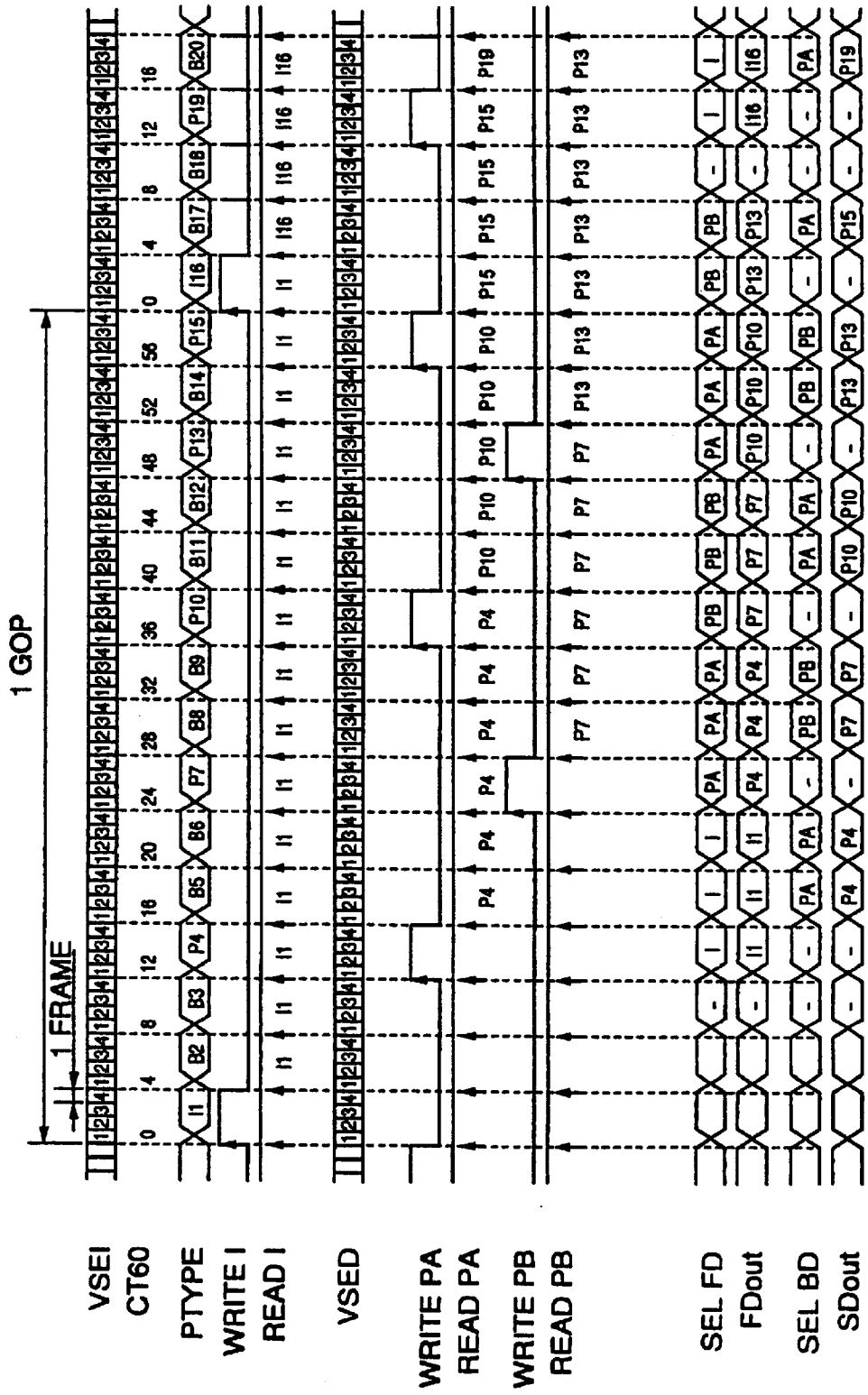
FIG. 20 is a timing diagram showing the operation of the image memory circuit 142 shown in FIG. 19.

FIG. 20 is a timing diagram showing the operation of the image memory circuit 142 shown in FIG. 19.

The detailed description of the operation timing of the image memory circuit 142 shown in FIG. 20 will be omitted here, because the operation timing is the same as that of the picture reordering circuit 141 shown in FIG. 18.

The image memory circuit 142 writes data to, and read data from, the memories 161–163 controlled by the memory control circuit 166, and gets video data FDout selected by the selection circuit 164 and video data BDout selected by the selection circuit 165.

The motion compensation circuit 82 shown in FIG. 16 uses the video data FDout for forward motion compensation, and BDout for backward motion compensation.

Like the picture reordering circuit 141 shown in FIG. 17, four frames of the video data FDout or BDout, entered from video input terminals 1–4, are treated as one group of data and are synchronized with the input video data VSED before being output.

This allows the motion compensation circuit 82, addition circuit 80, and subtracter 72 to process video data from the same video input terminal.

Strictly speaking, VSEI and VSED do not match exactly because of the time required for DCT conversion and quantization. FIG. 20 ignores this mismatch to prevent the figure from becoming confusing.

The camera code CCODE is delayed by the delay circuit 144 by the time needed for video data encoding, is synchronized with the video coded data output from the buffer memory 77, and is added to the picture layer of each frame by the video multiplexer circuit 87 as the user data.

Next, the MPEG decoding circuit 132 will be described.

Figure 21:
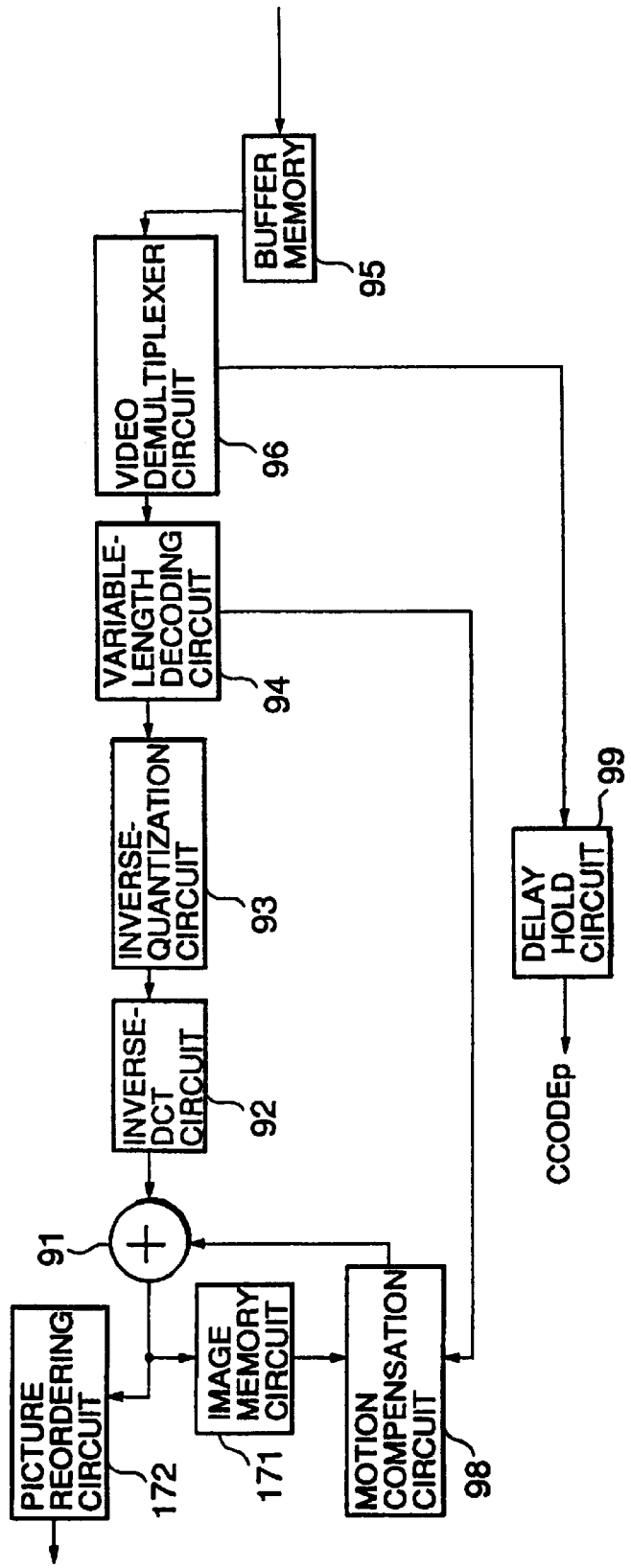
FIG. 21 is a diagram showing the outline of the MPEG decoding circuit 132 shown in FIG. 15.

FIG. 21 is a diagram showing the outline of the MPEG decoding circuit 132 shown in FIG. 15.

In this figure, number 171 refers to an image memory circuit and number 172 refers to an picture reordering circuit. The other part of the configuration is the same as that of the MPEG decoding circuit 15 shown in FIG. 11. The detailed description of a functionally-equivalent component is omitted here, with the same number assigned to the corresponding component of the MPEG decoding circuit 15 shown in FIG. 11.

The circuit configuration of the image memory circuit 171 is the same as that of the MPEG encoding circuit 131 shown in FIG. 19.

In the image memory circuit 171, the circuit corresponding to the memory control circuit 166 shown in FIG. 19 generates memory control signals such as the Write Enable signal "write I" and the Read Enable signal "read I", shown in FIG. 20, based on the camera code added to each frame and the image type code.

In the image memory circuit 171, the sequence of video data entered into each of the memories corresponding to the memories 161–163 shown in FIG. 19 and the above control signals are the same as those shown in FIG. 20.

Therefore, video data from the image memory circuit 171 is also output in the timing shown in FIG. 20 and is supplied to the motion compensation circuit 98 as the forward reference image data FDout and as the backward reference image data BDout.

The picture reordering circuit 172, with the same circuit configuration as that of the picture reordering circuit 141 of the MPEG encoding circuit 131 shown in FIG. 17, reorders picture data in the reverse order of data generated by the picture reordering circuit 141.

That is, the circuit writes image data, entered in the sequence shown by Nout in FIG. 18, into the memories 151–154 shown in FIG. 17, reorders it, and then reads it. By doing so, the circuit outputs the image data in the original sequence shown by VSEI in FIG. 18.

The description of the detailed circuit configuration and the timing diagram will be omitted here, because the operation is the same as that of picture reordering during the normal MPEG decoding operation except that four frames are processed as a group.

In the second embodiment described above, the picture reordering circuit 141 reorders the mixed video signal, generated by the synchronization switching circuit 5 by sequentially switching, one frame at a time, the video signals which are received sequentially by the video input terminals 1–4, into video data composed of a sequence of four frames each sequentially received by the video input terminals 1–4, and sends the video data to the motion compensation circuit 82 at an interval of k times of the four frames (k is a natural number).

The image memory circuit 142 also reads and writes video data sequentially received by video input terminals 1–4, four frames at time, and sends the video data to the motion compensation circuit 82 at an interval of k times of the four frames (k is a natural number) as the reference image.

As a result, the motion compensation circuit 82 performs compensation among a plurality of frames from the same camera, each separated at the above interval. Thus, interframe predictive encoding provides the same effect as that obtained by encoding video data from one camera, ensuring a high data compression ratio.

In addition, the second embodiment has the memory circuits for processing video from a plurality of cameras (picture reordering circuits 141 and 172 and image memory circuits 142 and 171) installed inside the MPEG encoding circuit 131 and the MPEG decoding circuit 132, thus eliminating the need for the memory (1R) 6–memory (4R) 9 and the memory (1P) 16–the memory (4P) 19 shown in FIG. 1 and making the system simpler.

While the preferred forms of the invention have been described, it is to be understood that changes and variations may be made without departing from the spirit or scope of the invention.

For example, although inter-frame predictive encoding is used in the above embodiments, inter-field predictive encoding may also be used. This may be accomplished by replacing all "frames" that appear in the description of the first and second embodiments with "fields".

In addition, a plurality of memories used in the embodiments may be combined into one.

The recording/playback system according to this invention may be applied not only to a video surveillance system but also to all types of recording/playback systems which record and play back a mixed video signal composed of a plurality of video signals.

As described above, a system according to this invention compresses each of a plurality of video data items through inter-frame predictive encoding, efficiently compressing mixed video data.

What is claimed is:

1. A video data compression system which compresses, using one encoder, mixed video data generated by sequentially switching video data obtained from a plurality of video cameras, every predetermined frames or fields interval, wherein an order of video data frames or fields in said mixed video data is sorted so that a predetermined number of video data frames or fields obtained from a same video camera are made continuous, said predetermined number being larger than a number of video data frames or fields contained in said predetermined frames or fields interval, and said mixed video data thus sorted is compressed by performing predictive encoding on a frame basis or on a field basis for each of said predetermined number of video data frames or fields.

2. A video data compression system according to claim 1, further comprising:
predictive encoder which performs said predictive encoding among a plurality of frames or fields of said mixed video data, wherein
said predictive encoder performs said predictive encoding on frames or fields appearing at an interval represented by a product of the number of said predetermined frames or fields, the number of said plurality of video cameras, and a natural number, whereby predictive encoding is performed on a camera-by-camera basis.

3. A video data compression system according to claim 2, further comprising:
decoder which decodes said mixed video data encoded through said predictive encoding of said predictive encoder, wherein,
said decoder performs decoding on frames or fields appearing at the interval represented by the product of the number of said predetermined frames or fields, the number of said plurality of video cameras, and the natural number.

4. A video data compression system which compresses mixed video data generated by sequentially switching video data obtained from a plurality of video cameras, every predetermined frames or fields, wherein said mixed video data is compressed in such a manner that predictive encoding is performed on a camera-by-camera basis, comprising:
a first storage unit which stores said mixed video data;
a first controller which controls writing and reading said mixed video data to and from said first storage unit; and
a predictive encoder which performs said predictive encoding among a plurality of frames or fields of said mixed video data, wherein,
said first storage unit has a storage volume for storing video data corresponding to frames or fields, the number of which is larger than a number represented by a product of the number of said predetermined number of frames or fields and the number of said plurality of video cameras,
said first controller writes said mixed video data into said first storage unit, said mixed video data being divided into video data groups by said plurality of video cameras, and sequentially reads said video data groups, a plurality of frames or fields whose number is larger than the predetermined frames or fields at a time, from said first storage unit, and
said predictive encoder performs predictive encoding among a plurality of frames or fields of a video data group read at a time from said first storage unit, whereby said predictive encoding is performed on a camera-by-camera basis.

5. A video data compression system according to claim 4, further comprising:
a decoder which decodes said mixed video data encoded through said predictive encoding by said predictive encoder;
a second storage unit which stores said decoded mixed video data by said decoder; and
a second controller which controls writing and reading said decoded mixed video data to and from said second storage unit, wherein,
said second storage unit has a storage volume for storing decoded video data corresponding to frames or fields, the number of which is larder than a number represented by a product of the number of said predetermined frames or fields and the number of said plurality of video cameras, and
said second controller writes said decoded mixed video data into said second storage unit, said decoded mixed video data being divided into decoded video data groups by said plurality of video cameras, according to a sequence in which said first controller read said mixed video data from said first storage unit, and reads said decoded video data groups from said second storage unit according to a sequence in which said first controller wrote said mixed video data into said first storage unit, whereby, the sequence of frames or fields of said decoded mixed video data is restored to a sequence nearly equal to the sequence of frames or fields of said mixed video data before performing predictive encoding.

6. A video data compression system which compresses video data from a plurality of video cameras, comprising:
a video data acquisition unit which sequentially acquires video data from said plurality of video cameras by sequentially switching video data from said plurality of video cameras every predetermined frames or fields interval to generate mixed video data;
a storage unit which stores said mixed video data;
a controller which controls writing and reading of said mixed video data to and from said storage unit; and
a predictive encoder, which performs predictive encoding on a frame basis or on a field basis for said mixed video data read from said storage unit, wherein,
an order of video data frames or fields in said mixed video data read from said storage unit is sorted by said controller, so that a predetermined number of video data frames or fields obtained from a same video camera are made continuous, said predetermined number being larger than a number of video data frames or fields contained in said predetermined frames or fields interval, and
said mixed video data thus sorted is compressed by said predictive encoder which performs said predictive encoding for each of said predetermined number of video data frames or fields.

7. A video data compression system which compresses video data from a plurality of video cameras, comprising:
a video data acquisition unit which sequentially acquires video data from said plurality of video cameras every predetermined number of frames or fields; and
a predictive encoder, which performs predictive encoding among a plurality of frames or fields of said sequentially acquired video data, wherein,
said predictive encoder performs said predictive encoding on frames or fields appearing at an interval represented by a product of the number of said predetermined frames or fields and the number of said plurality of video cameras, whereby predictive encoding is performed on a camera-by-camera basis;
said video data acquisition unit comprises:
a first storage unit which stores said video data from said plurality of video cameras; and
a first controller which controls writing and reading of said video data from said plurality of video cameras to and from said first storage unit, and wherein,
said first controller sequentially writes said video data from said plurality of video cameras into said first storage unit by sequentially switching said video data from said plurality of video cameras every predetermined number of frames or fields, and sequentially reads said video data from said plurality of cameras, a plurality of frames or fields at a time, the number of which is larger than the predetermined frames or fields interval, from said first storage unit, and said predictive encoder performs said predictive encoding among said plurality of frames or fields read at a time from said first storage unit.

8. A video data compression system according to claim 7, further comprising:

a decoder which decodes said video data from said plurality of video cameras encoded through predictive encoding by said predictive encoder;

a second storage unit which stores said decoded video data from said plurality of video cameras by said decoder; and a second controller which controls writing and reading of said decoded video data from said plurality of video cameras to and from said second storage unit, wherein, said second controller sequentially writes said decoded video data from said plurality of video cameras into said second storage unit, according to a sequence in which said first controller sequentially reads said video data from said plurality of video cameras from said first storage unit, and sequentially reads said decoded video data from said plurality of video cameras from said second storage unit, according to a sequence in which said first controller sequentially wrote said video data from said plurality of video cameras into said first storage unit.

9. A video recording/playback system, comprising:

a mixed video data generator which generates mixed video data by sequentially switching video data from a plurality of video cameras every predetermined number of frames or fields;

a first storage unit which stores said mixed video data generated by said mixed video data generator;

a first controller which controls writing and reading of said mixed video data to and from said first storage unit;

a predictive encoder which performs predictive encoding among a plurality of frames or fields of said mixed video data;

a recording/playback unit which performs recording and playing back of said mixed video data to and from a recording medium, said mixed video data being encoded by said predictive encoder;

a decoder which decodes said mixed video data played back by said recording/playback unit, said mixed video data being encoded by said predictive encoder;

a second storage unit which stores said decoded mixed video data decoded by said decoder; and a second controller which controls writing and reading of said decoded mixed video data to and from said second storage unit, wherein, said first controller writes said mixed video data into said first storage unit, said mixed video data being divided into video data groups by said plurality of video cameras, and sequentially reads said video data groups a plurality of frames or fields at a time, the number of which is larger than the predetermined frames or fields, from said first storage unit, said predictive encoder performs predictive encoding among a plurality of frames or fields of a video data group read at a time from said first storage unit, and said second controller writes said decoded mixed video data into said second storage unit, said decoded mixed video data being divided into decoded video data groups from said plurality of video cameras, according to a sequence in which said first controller read said mixed video data from said first storage unit, and reads said decoded video data groups from said second storage unit according to a sequence in which said first controller wrote said mixed video data into said first storage unit, whereby the sequence of frames or fields of said decoded mixed video data is restored to a sequence nearly equal to the sequence of frames or fields of said mixed video data before performing said predictive encoding.

10. A video recording/playback system comprising:

a mixed video data generator which generates mixed video data by sequentially switching video data from a plurality of cameras on a frame basis or on a field basis, each of the frame and the field being composed of a predetermined number of images;

a predictive encoder which performs predictive encoding among a plurality of images of said mixed video data;

a recording/playback unit which performs recording and playing back of said mixed video data to and from a recording medium, said mixed video data being encoded by said predictive encoder; and a decoder which decodes said mixed video data played back by said recording/playback unit, said mixed video data being predictive-encoded by said predictive encoder, wherein, said predictive encoder performs said predictive encoding on a plurality of images appearing at an interval of a number of images, the number being a product of the predetermined number of images, the number of said plurality of cameras, and a natural number, and wherein, said decoder decodes said mixed video data encoded through predictive encoding of said predictive encoder, by decoding a plurality of images appearing at the interval of the number of images, the number being the product of said predetermined number of images, the number of said plurality of cameras, and the natural number.

11. A video recording/playback system comprising:

a first storage unit which stores video data generated by a plurality of cameras;

a first controller which controls writing and reading said video data to and from said first storage unit;

a predictive encoder which performs predictive encoding among a plurality of frames or fields of said video data;

a recording/playback unit which performs recording and playing back of said video data to and from a recording medium, said video data being encoded by said predictive encoder;

a decoder which decodes said video data played back by said recording/playback unit, said video data being predictive-encoded by said predictive encoder;

a second storage unit which stores said decoded video data decoded by said decoder; and a second controller which controls writing and reading said decoded video data to and from said second storage unit, wherein, said first controller sequentially writes said video data from said plurality of cameras into said first storage unit by sequentially switching video data from said plurality of video cameras every predetermined number of frames or fields, and sequentially reads said video data from said plurality of video cameras, a plurality of frames or fields at a time, the number of which is larger than the predetermined frames or fields, from said first storage unit, said predictive encoder performs predictive encoding among said plurality of frames or fields read at a time from said first storage unit, and said second controller sequentially writes said decoded video data from said plurality of video cameras into said second storage unit, according to a sequence in which said first controller sequentially read said video data from said plurality of video cameras from said first storage unit, and sequentially reads said decoded video data from said plurality of video cameras from said second storage unit, according to a sequence in which said first controller wrote said video data from said plurality of video cameras into said first storage unit.

12. A video data compression method for compressing, using one encoder, mixed video data generated by sequentially switching video data from a plurality of video cameras every predetermined frames or fields interval, wherein an order of video data frames or fields in said mixed video data is sorted so that a predetermined number of video data frames or fields obtained from a same video camera are made continuous, said predetermined number being larger than a number of video data frames or fields contained in said predetermined frames or fields interval, and said mixed video data thus sorted is compressed by performing predictive encoding on a frame basis or on a field basis for each of said predetermined number of video data frames or fields.

13. A video data compression method for compressing video data from a plurality of video cameras, comprising the steps of:

sequentially acquiring video data from said plurality of video cameras by sequentially switching video data from said plurality of video cameras every predetermined frames or fields interval to generate mixed video data;

storing said mixed video data in a storage unit;

reading said mixed video data from said storage unit, wherein an order of video data frames or fields in said mixed video data is sorted so that a predetermined number of video data frames or fields obtained from a same video camera are made continuous, said predetermined number being larger than a number of video data frames or fields contained in said predetermined frames or fields interval, and performing predictive encoding on a frame basis or on a field basis for each of said predetermined number of video data frames or fields, whereby said mixed video data thus sorted is compressed.

* * * * *